(12) United States Patent
Morimoto et al.

(10) Patent No.: US 11,973,427 B2
(45) Date of Patent: Apr. 30, 2024

(54) DOUBLE STEP-DOWN CHOPPER CIRCUIT

(71) Applicant: Mitsubishi Electric Corporation, Tokyo (JP)

(72) Inventors: Yusuke Morimoto, Tokyo (JP); Yasuyuki Miyazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 344 days.

(21) Appl. No.: 17/420,748

(22) PCT Filed: Feb. 6, 2020

(86) PCT No.: PCT/JP2020/004636
§ 371 (c)(1),
(2) Date: Jul. 6, 2021

(87) PCT Pub. No.: WO2020/175078
PCT Pub. Date: Sep. 3, 2020

(65) Prior Publication Data
US 2022/0069716 A1 Mar. 3, 2022

(30) Foreign Application Priority Data
Feb. 25, 2019 (JP) ................. 2019-031928

(51) Int. Cl.
*H02M 3/158* (2006.01)
*H02M 1/15* (2006.01)

(52) U.S. Cl.
CPC ........... *H02M 3/1586* (2021.05); *H02M 1/15* (2013.01)

(58) Field of Classification Search
CPC ........ H02M 1/15; H02M 3/156; H02M 3/158; H02M 3/1586; H02M 3/1588
See application file for complete search history.

(56) References Cited

U.S. PATENT DOCUMENTS 4,748,397 A * 5/1988 Ogawa ................. H02M 3/142
323/272
5,059,887 A 10/1991 Iida et al.
(Continued)

FOREIGN PATENT DOCUMENTS

JP S5851772 A 3/1983
JP H01283057 A 11/1989
(Continued)

OTHER PUBLICATIONS

International Search Report (PCT/ISA/210) and Written Opinion (PCT/ISA/237) dated Apr. 21, 2020, by the Japan Patent Office as the International Searching Authority for International Application No. PCT/JP2020/004636.

*Primary Examiner* — Gary L Laxton
(74) *Attorney, Agent, or Firm* — BUCHANAN INGERSOLL & ROONEY PC

(57) ABSTRACT

A phase difference correction control unit determines, based on a difference between a voltage of a first input smoothing capacitor and a voltage of a second input smoothing capacitor, a difference between a current flowing through a first switching element and a current flowing through a second switching element, or a difference between a reactor current when a gate signal of the first switching element is turned on and a reactor current when a gate signal of the second switching element is turned on, an amount of correction of a difference between a phase of switching of the first switching element and a phase of switching of the second switching element. A switching control unit switches the first switching element and the second switching element based on the amount of correction.

20 Claims, 18 Drawing Sheets

(56) References Cited

U.S. PATENT DOCUMENTS

| | | | |
|---|---|---|---|
| 9,812,966 B2 * | 11/2017 | Kubouchi | ............... H02M 1/32 |
| 2012/0307526 A1 | 12/2012 | Senanayake | |
| 2019/0149035 A1 * | 5/2019 | Kubouchi | ............... H02M 1/32 |
| | | | 323/271 |

FOREIGN PATENT DOCUMENTS

| | | |
|---|---|---|
| JP | H0382364 A | 4/1991 |
| JP | H04260 A | 1/1992 |
| JP | 2008295228 A | 12/2008 |
| JP | 2012253942 A | 12/2012 |
| JP | 2017192297 A | 10/2017 |

* cited by examiner

FIG.4
(a)
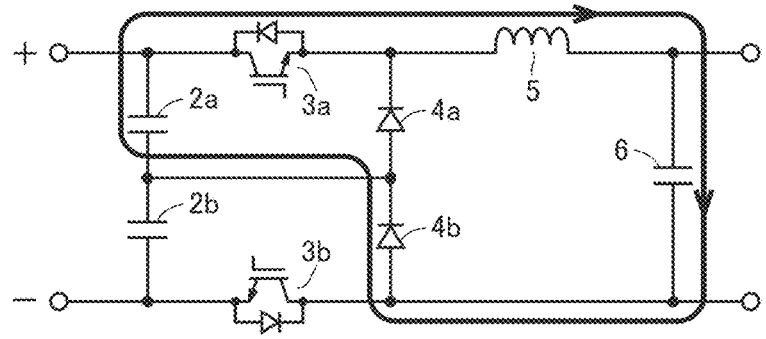
(b)
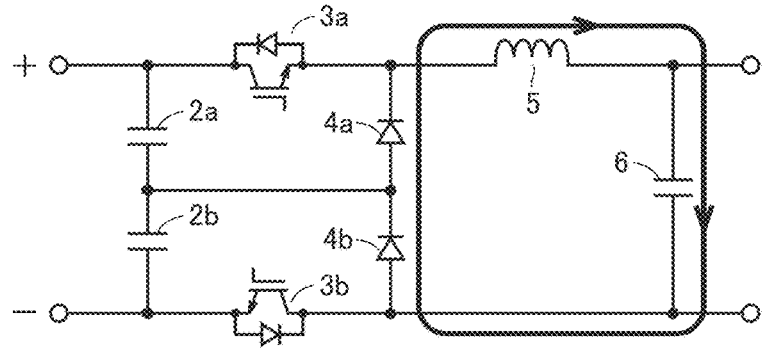
(c)
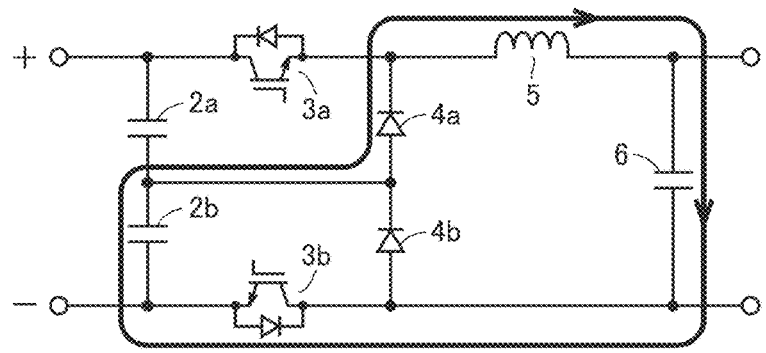
(d)
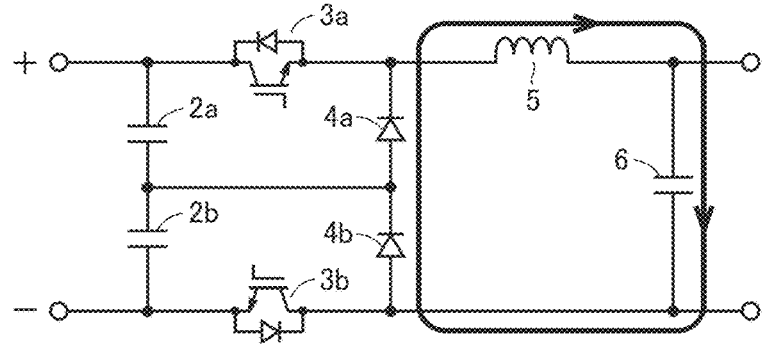

DOUBLE STEP-DOWN CHOPPER CIRCUIT

TECHNICAL FIELD

The present disclosure relates to a double step-down chopper circuit.

BACKGROUND ART

An air-conditioning inverter apparatus for a railroad vehicle includes a step-down chopper circuit at a stage preceding an inverter, in order to stabilize variation in input voltage supplied from a DC overhead wire. The step-down chopper circuit includes input smoothing capacitors, switching elements, freewheeling diodes, a smoothing reactor, and an output smoothing capacitor. The step-down chopper circuit controls ON/OFF of the switching elements, to step down the input DC voltage to obtain a desired DC voltage.

A technique is known for, when an input voltage is a high voltage, ensuring a breakdown voltage and reducing voltage and current ripples by a double step-down chopper circuit including two stages of cascaded switching elements (for example, see PTL 1).

CITATION LIST

Patent Literature

PTL 1: Japanese Patent Laying-Open No. 4-260

SUMMARY OF INVENTION

Technical Problem

For subways or streetcars, for example, an overhead wire voltage of DC 600 V is employed. A DC overhead wire is characterized by a frequent occurrence of contact loss where mechanical contact is lost, and by wide variation (about ±30%) in overhead wire voltage. In the DC 600 V overhead wire, the voltage varies from about 420 V to about 780 V. To address such high voltage and wide voltage variation, an air-conditioning inverter apparatus for a railroad vehicle employs a double step-down chopper for stepping down and stabilizing the overhead wire voltage.

When applying a conventional double step-down chopper to the DC 600 V overhead wire, electrolytic capacitors having a large capacitance need to be used for input smoothing capacitors in order to address the frequent occurrence of contact loss. The overhead wire voltage increases to a maximum of 780 V, and the voltage is halved and applied to the positive input smoothing capacitor and the negative input smoothing capacitor. As a result, the positive and negative input smoothing capacitors each need a rated voltage of at least not less than DC 450 V, including tolerances.

Generally, electrolytic capacitors vary in capacitance, and the capacitance decreases due to repeated charging and discharging. Even the same electrolytic capacitors deteriorate at different rates due to a difference in usage conditions or installation environment, resulting in variation between their capacitances.

When two input smoothing capacitors are connected in series, a higher voltage is applied to an input smoothing capacitor having a smaller capacitance. When variation occurs between capacitances of the two input smoothing capacitors, a voltage applied to the positive input smoothing capacitor and a voltage applied to the negative input smoothing capacitor are imbalanced.

One method for suppressing the voltage imbalance is to provide balancing resistors in parallel with the input smoothing capacitors. However, while the balance can be achieved by the balancing resistors before circuit start-up, it is difficult to balance the voltages using only the balancing resistors after circuit start-up, as the voltages depend on a load having greater power.

When the voltage imbalance occurs, a protective function provided to protect the input smoothing capacitors from overvoltage may operate, causing an air-conditioning system using the double step-down chopper to stop. One of the input smoothing capacitors may also exceed the rated voltage. In order to avoid these situations, electrolytic capacitors having a high breakdown voltage need to be selected in consideration of the voltage imbalance. Generally, however, there are only a few types of electrolytic capacitors having a high breakdown voltage exceeding DC 450 V and a large capacitance, and they are not widely available and are also expensive. For this reason, it is also contemplated to ensure a breakdown voltage by connecting two readily available and inexpensive electrolytic capacitors having a rated voltage of not more than DC 450 V in series to each of the positive side and the negative side. The capacitance, however, is halved by the serial connection of two electrolytic capacitors. To ensure a capacitance sufficient to address the contact loss, therefore, other electrolytic capacitors need to be added also in parallel. This results in increased cost and size of an air-conditioning apparatus.

In addition, a voltage applied to an input smoothing capacitor having a reduced capacitance increases. Since a positive switching element and a negative switching element operate at the same duty, a charging current increases for a capacitor having a smaller capacitance, to accelerate deterioration of the capacitor.

The present disclosure was made to solve the problem described above, and has an object to provide a double step-down chopper capable of suppressing an imbalance between voltages applied to two input smoothing capacitors even if variation occurs between capacitances of the two input smoothing capacitors.

Solution to Problem

A double step-down chopper circuit of the present disclosure includes: a first input smoothing capacitor and a second input smoothing capacitor connected in series between a first node connected to a positive electrode of an input power supply and a second node connected to a negative electrode of the input power supply; a first switching element disposed between the first node and a third node; a second switching element disposed between a fourth node to which one end of a load is connected and the second node; a first freewheeling diode disposed between a fifth node between the first input smoothing capacitor and the second input smoothing capacitor and the third node; a second freewheeling diode disposed between the fifth node and the fourth node; a reactor disposed between a sixth node to which the other end of the load is connected and the third node; an output smoothing capacitor disposed between the sixth node and the fourth node; a phase difference correction control unit to determine, based on a difference between a voltage of the first input smoothing capacitor and a voltage of the second input smoothing capacitor, a difference between a current flowing through the first switching element and a current flowing through the second switching element, or a difference between a reactor current when a gate signal of the first switching element is turned on and a reactor current when a gate signal of the second switching element is turned on, an amount of correction of a difference between a phase of switching of the first switching element and a phase of switching of the second switching element; and a switching control unit to switch the first switching element and the second switching element based on the amount of correction.

A double step-down chopper circuit of the present disclosure includes: a first input smoothing capacitor and a second input smoothing capacitor connected in series between a first node connected to a positive electrode of an input power supply and a second node connected to a negative electrode of the input power supply; a first switching element disposed between the first node and a third node; a second switching element disposed between a fourth node to which one end of a load is connected and the second node; a first freewheeling diode disposed between a fifth node between the first input smoothing capacitor and the second input smoothing capacitor and the third node; a second freewheeling diode disposed between the fifth node and the fourth node; a reactor disposed between a sixth node to which the other end of the load is connected and the third node; an output smoothing capacitor disposed between the sixth node and the fourth node; a duty correction control unit to determine, based on a difference between a voltage of the first input smoothing capacitor and a voltage of the second input smoothing capacitor, a difference between a current flowing through the first switching element and a current flowing through the second switching element, or a difference between a reactor current when a gate signal of the first switching element is turned on and a reactor current when a gate signal of the second switching element is turned on, amounts of correction of an ON-duty of switching of the first switching element and an ON-duty of switching of the second switching element; and a switching control unit to switch the first switching element and the second switching element based on the amounts of correction.

Advantageous Effects of Invention

According to the double step-down chopper of the present disclosure, an imbalance between voltages applied to two input smoothing capacitors can be suppressed even if variation occurs between capacitances of the two input smoothing capacitors.

BRIEF DESCRIPTION OF DRAWINGS

FIG. 4 shows current paths of the first step-down operation pattern.

DESCRIPTION OF EMBODIMENTS

In the following, embodiments will be described with reference to the drawings.

Reference Example

Figure 1:
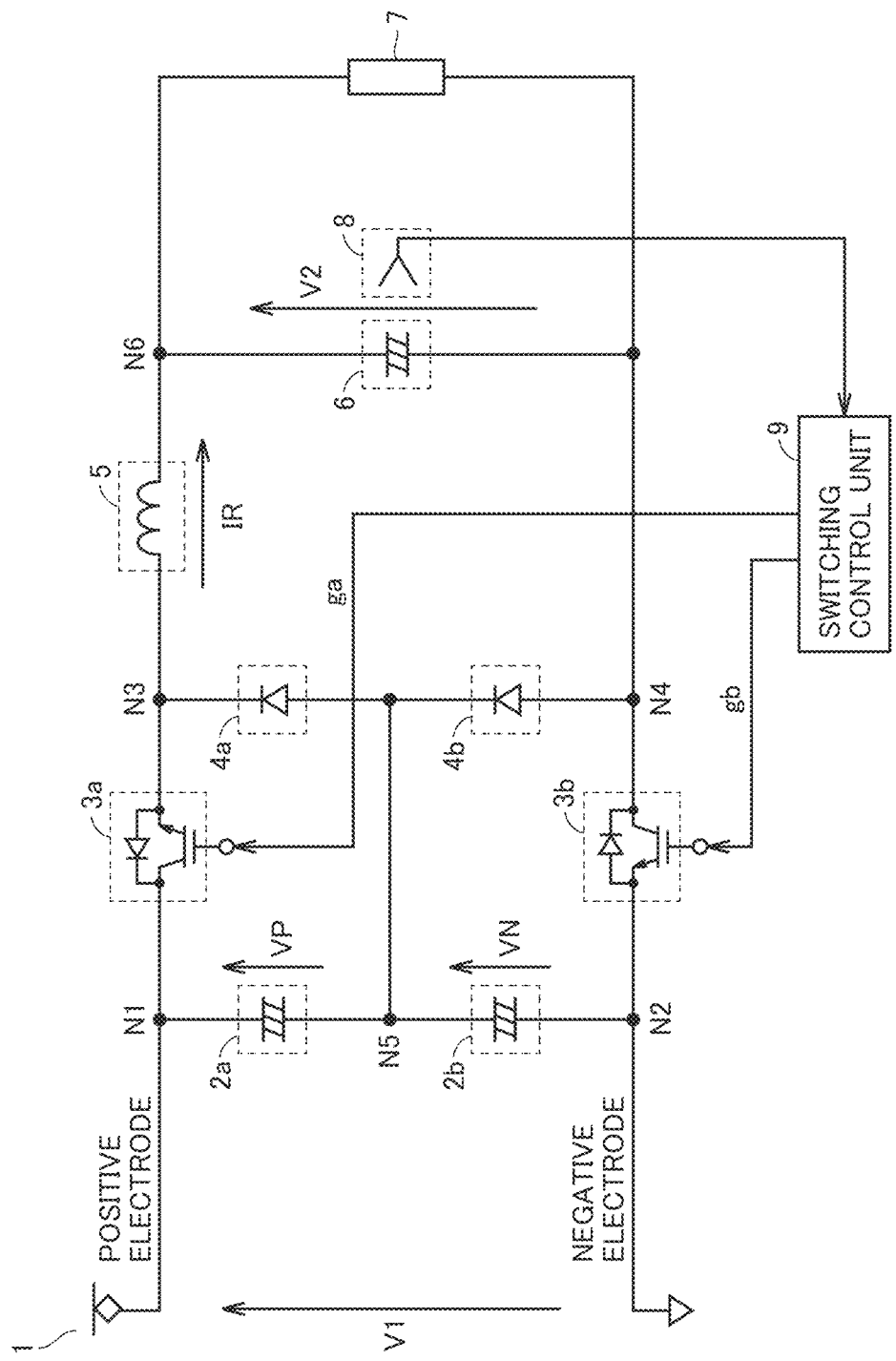
FIG. 1 is a diagram representing a circuit configuration of a double step-down chopper in a reference example.

FIG. 1 is a diagram representing a circuit configuration of a double step-down chopper in a reference example.

In FIG. 1, a first stage of a step-down chopper and a second stage of a step-down chopper are cascaded to a DC power supply 1 (input voltage V1) corresponding to a DC overhead wire. The first stage of the step-down chopper includes a first input smoothing capacitor 2a, a first switching element 3a, and a first freewheeling diode 4a. The second stage of the step-down chopper includes a second input smoothing capacitor 2b, a second switching element 3b, and a second freewheeling diode 4b.

A smoothing reactor 5 and an output smoothing capacitor 6 are connected in series between a connection node N1 of first switching element 3a and first freewheeling diode 4a connected to a positive side of DC power supply 1, and a connection node N2 of second switching element 3b and second freewheeling diode 4b connected to a negative side of DC power supply 1.

A load 7 is connected across output smoothing capacitor 6.

In this circuit configuration, switching operation is performed such that first switching element 3a connected to the positive side and second switching element 3b connected to the negative side have a phase difference of 180° from each other, and furthermore, an ON-duty (duty factor) of switching of first switching element 3a connected to the positive side and second switching element 3b connected to the negative side is controlled, to generate a desired output voltage V2 with respect to input voltage V1.

Generally, an output voltage detection unit 8 that detects output voltage V2 applied to output smoothing capacitor 6 detects an output voltage value, and a switching control unit 9 performs feedback control based on the detected output voltage value, to determine the ON-duty of switching of the switching elements. With such control, output voltage V2 can be controlled to be a stable and constant voltage with respect to variation in input voltage V1. ON-duty D of switching of the step-down chopper has a relation of D=V2/V1, when expressed by input voltage V1 and output voltage V2.

Embodiment 1

Figure 2:
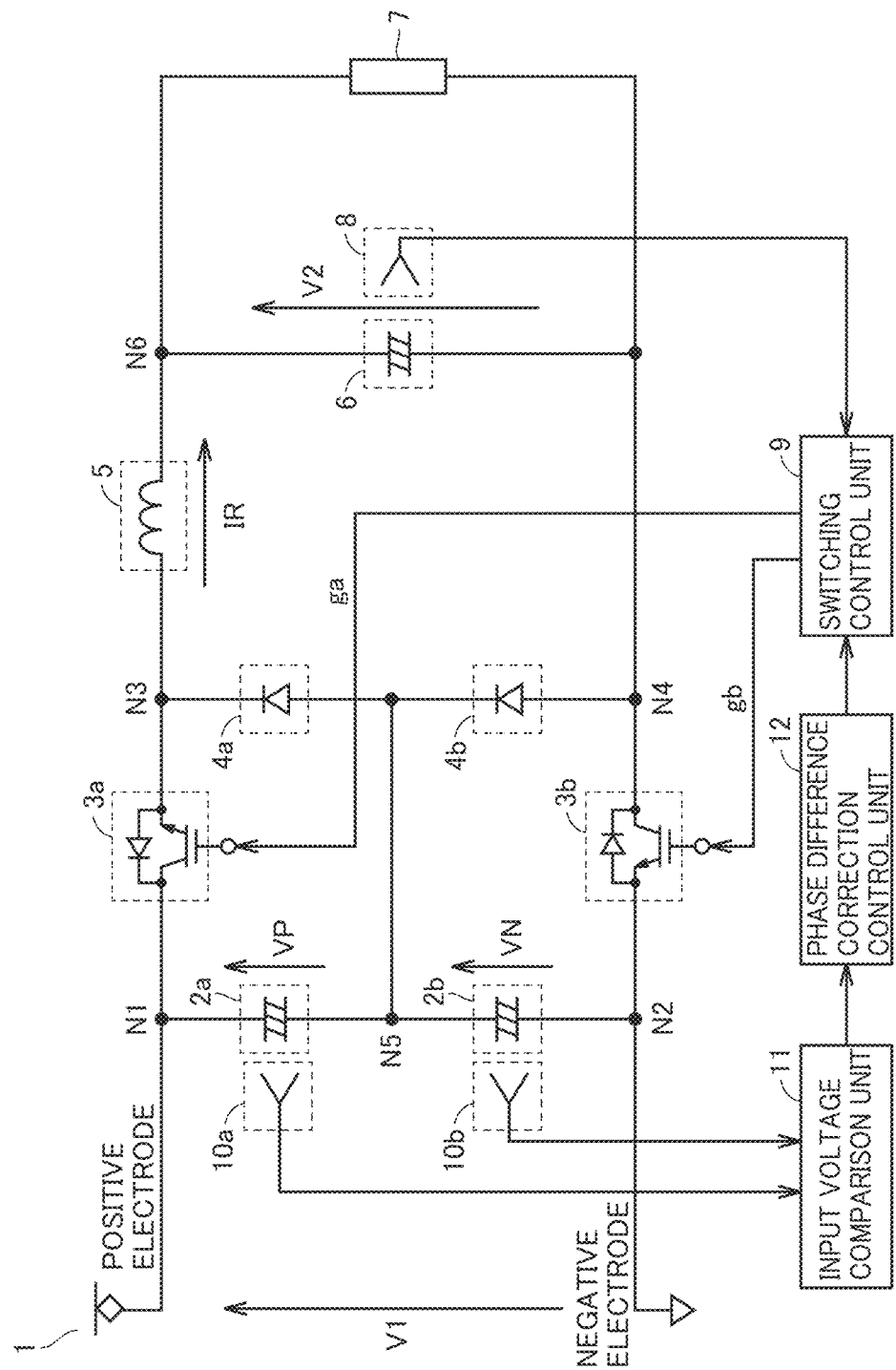
FIG. 2 is a diagram representing a circuit configuration of a double step-down chopper in Embodiment 1.

FIG. 2 is a diagram representing a circuit configuration of a double step-down chopper in Embodiment 1.

The double step-down chopper in Embodiment 1 is connected to a DC power supply 1 (input voltage V1) corresponding to a DC overhead wire, and steps down an input voltage input from DC power supply 1 and supplies an output voltage V2 lower than the input voltage to a load 7. Load 7 is an inverter, for example.

A first stage of a step-down chopper and a second stage of a step-down chopper are cascaded to DC power supply 1 (input voltage V1) corresponding to a DC overhead wire. The first stage of the step-down chopper includes a first input smoothing capacitor 2a, a first switching element 3a, and a first freewheeling diode 4a. The second stage of the step-down chopper includes a second input smoothing capacitor 2b, a second switching element 3b, and a second freewheeling diode 4b.

The double step-down chopper circuit further includes a smoothing reactor 5, an output smoothing capacitor 6, an output voltage detection unit 8, a switching control unit 9, a first input voltage detection unit 10a, a second input voltage detection unit 10b, an input voltage comparison unit 11, and a phase difference correction control unit 12. While first switching element 3a and second switching element 3b can each be implemented by an IGBT, the effect is not compromised if they are each implemented by another switching element such as a MOSFET.

A node N1 (first node) is connected to a positive electrode. A node N2 (second node) is connected to a negative electrode.

First input smoothing capacitor 2a and second input smoothing capacitor 2b are connected in series between node N1 and node N2. First input smoothing capacitor 2a has one end connected to node N1. Second input smoothing capacitor 2b has one end connected to node N2.

First freewheeling diode 4a and second freewheeling diode 4b are connected in series between a node N3 (third node) and a node N4 (fourth node). First freewheeling diode 4a has a cathode connected to node N3. Second freewheeling diode 4b has an anode connected to node N4.

The other end of first input smoothing capacitor 2a, the other end of second input smoothing capacitor 2b, the anode of first freewheeling diode 4a, and the cathode of second freewheeling diode 4b are connected to a node N5 (fifth node).

First switching element 3a is connected between node N1 and node N3. Second switching element 3b is connected between node N2 and node N4.

Smoothing reactor 5 is disposed between node N3 and a node N6 (sixth node). Output smoothing capacitor 6 is disposed between node N6 and node N4. Load 7 is connected in parallel with output smoothing capacitor 6.

Output voltage detection unit 8 detects an output voltage, i.e., a voltage across output smoothing capacitor 6. Output voltage detection unit 8 transmits a signal representing the detected voltage to switching control unit 9.

Switching control unit 9 generates a gate signal ga to first switching element 3a and a gate signal gb to second switching element 3b based on the signal representing the voltage from output voltage detection unit 8, to control first switching element 3a and second switching element 3b.

An operation of the double step-down chopper circuit in Embodiment 1 will now be described.

The double step-down chopper circuit performs two patterns of step-down operation depending on the ON-duty of switching of first switching element 3a and second switching element 3b.

A first step-down operation pattern will be described first.

The first step-down operation pattern is an operation pattern when the ON-duty of switching of first switching element 3a and second switching element 3b is less than 0.5 (V1/2>V2).

Figure 3:
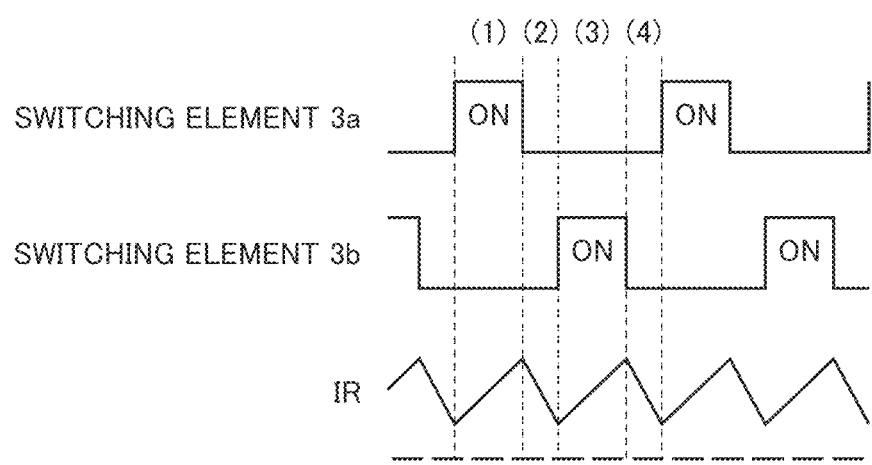
FIG. 3 is a timing chart of a first step-down operation pattern.

FIG. 3 is a timing chart of the first step-down operation pattern. FIG. 4 shows current paths of the first step-down operation pattern.

A switching cycle of first switching element 3a and a switching cycle of second switching element 3b are different by 180° (half cycle). Gate signal ga to first switching element 3a and gate signal ga to the second switching element are controlled at the same duty factor.

FIG. 4(a) is a diagram representing a current path during a period (1) in FIG. 3.

During the period (1), first switching element 3a is turned on, and smoothing reactor 5 is excited by a voltage charged into first input smoothing capacitor 2a. Thus, a smoothing reactor current IR gradually and linearly increases with the passage of time. At this time, the voltage applied to smoothing reactor 5 is the difference (V1/2−V2) between ½ of input voltage V1 and output voltage V2.

FIG. 4(b) is a diagram representing a current path during a period (2) in FIG. 3.

The period (2) is referred to as freewheeling period. During the period (2), first switching element 3a is changed to the OFF state, and smoothing reactor 5 is de-excited by a reverse voltage of output voltage V2 applied to smoothing reactor 5. With the de-excitation of smoothing reactor 5, smoothing reactor current IR decreases.

FIG. 4(c) is a diagram representing a current path during a period (3) in FIG. 3.

During the period (3), second switching element 3b is changed to the ON state, and smoothing reactor 5 is excited by a voltage charged into second input smoothing capacitor 2b. As in the period (1), the voltage applied to smoothing reactor 5 is the difference (V1/2−V2) between ½ of input voltage V1 and output voltage V2.

FIG. 4(d) is a diagram representing a current path during a period (4) in FIG. 3.

As with the period (2), the period (4) is also referred to as freewheeling period. During the period (4), second switching element 3b is changed to the OFF state, and smoothing reactor 5 is de-excited as in the period (2).

The above-described (1) to (4) are repeated to implement the step-down operation. In this operation of stepping down input voltage V1 to output voltage V2, the stepping down is from V1/2, i.e., ½ of input voltage V1, to output voltage V2, when attention is paid to the operation of each switching element. Thus, the operation can be implemented at a low step-down ratio.

A second step-down operation pattern is an operation pattern when the ON-duty of switching of first switching element 3a and second switching element 3b is equal to or more than 0.5 (V1/2<V2).

Figure 5:
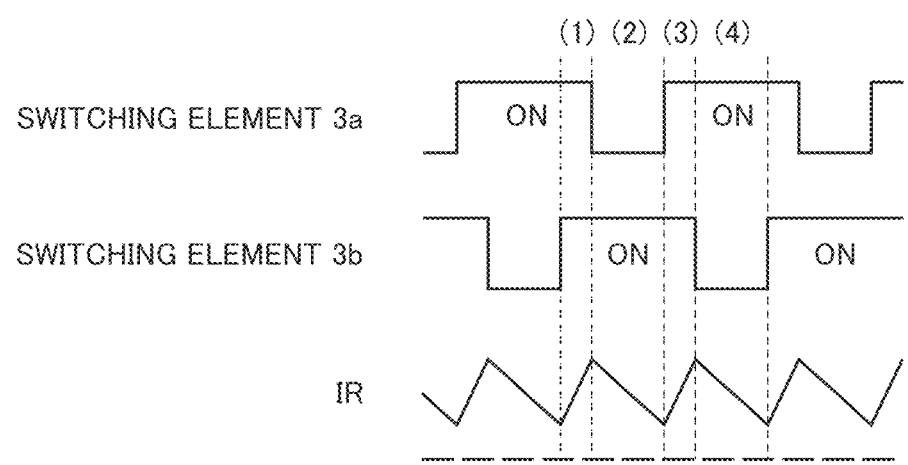
FIG. 5 is a timing chart of a second step-down operation pattern.
Figure 6:
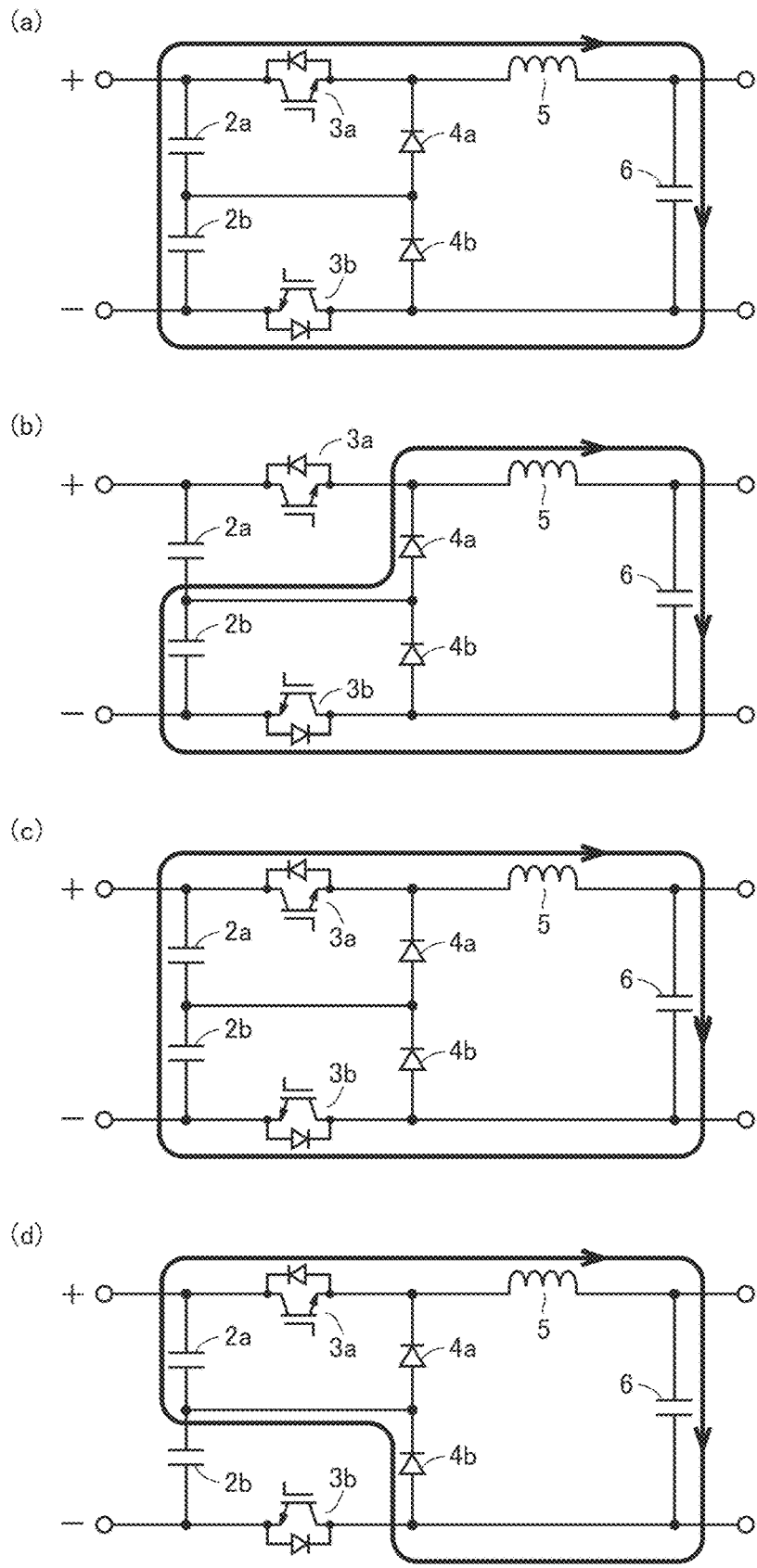
FIG. 6 shows current paths of the second step-down operation pattern.

FIG. 5 is a timing chart of the second step-down operation pattern. FIG. 6 shows current paths of the second step-down operation pattern.

FIG. 6(a) is a diagram representing a current path during a period (1) in FIG. 5.

During the period (1), first switching element 3a is turned on and second switching element 3b is turned on at the same timing. Smoothing reactor 5 is excited by a voltage (=V1) charged into first input smoothing capacitor 2a and second input smoothing capacitor 2b. The voltage applied to smoothing reactor 5 is the difference (V1–V2) between input voltage V1 and output voltage V2.

FIG. 6(b) is a diagram representing a current path during a period (2) in FIG. 5.

During the period (2), first switching element 3a is turned off, and second switching element 3b is turned on. Smoothing reactor 5 is de-excited by a differential voltage (V2–V1/2) between output voltage V2 and ½ of input voltage V1 applied to smoothing reactor 5.

FIG. 6(c) is a diagram representing a current path during a period (3) in FIG. 5.

During the period (3), first switching element 3a is turned on and second switching element 3b is turned on again at the same timing. Smoothing reactor 5 is thereby excited as in the period (1).

FIG. 6(d) is a diagram representing a current path during a period (4) in FIG. 5.

During the period (4), first switching element 3a is turned on, and second switching element 3b is turned off. During the period (4), smoothing reactor 5 is de-excited as in the period (2).

A plurality of cycles are repeated, with one cycle defined as (1) to (4) described above, to implement the step-down operation.

From the above description of operation, the double step-down chopper is capable of halving the input voltage to reduce the step-down ratio under a condition (1<duty<0.5) where the step-down ratio would inherently increase. In addition, by shifting the difference between the phase of switching of first switching element 3a and the phase of switching of second switching element 3b by the difference between the cycle of first switching element 3a and the cycle of second switching element 3b (=180°), the ripple frequency of smoothing reactor 5 and output smoothing capacitor 6 can be twice the switching frequency. Smoothing reactor 5 and output smoothing capacitor 6 can thereby be reduced in size.

In such a double step-down chopper circuit, when variation occurs between a capacitance of first input smoothing capacitor 2a and a capacitance of second input smoothing capacitor 2b, a voltage across first input smoothing capacitor 2a and a voltage across second input smoothing capacitor 2b are imbalanced. As a result, a higher voltage is applied to a capacitor having a smaller capacitance.

Figure 7:
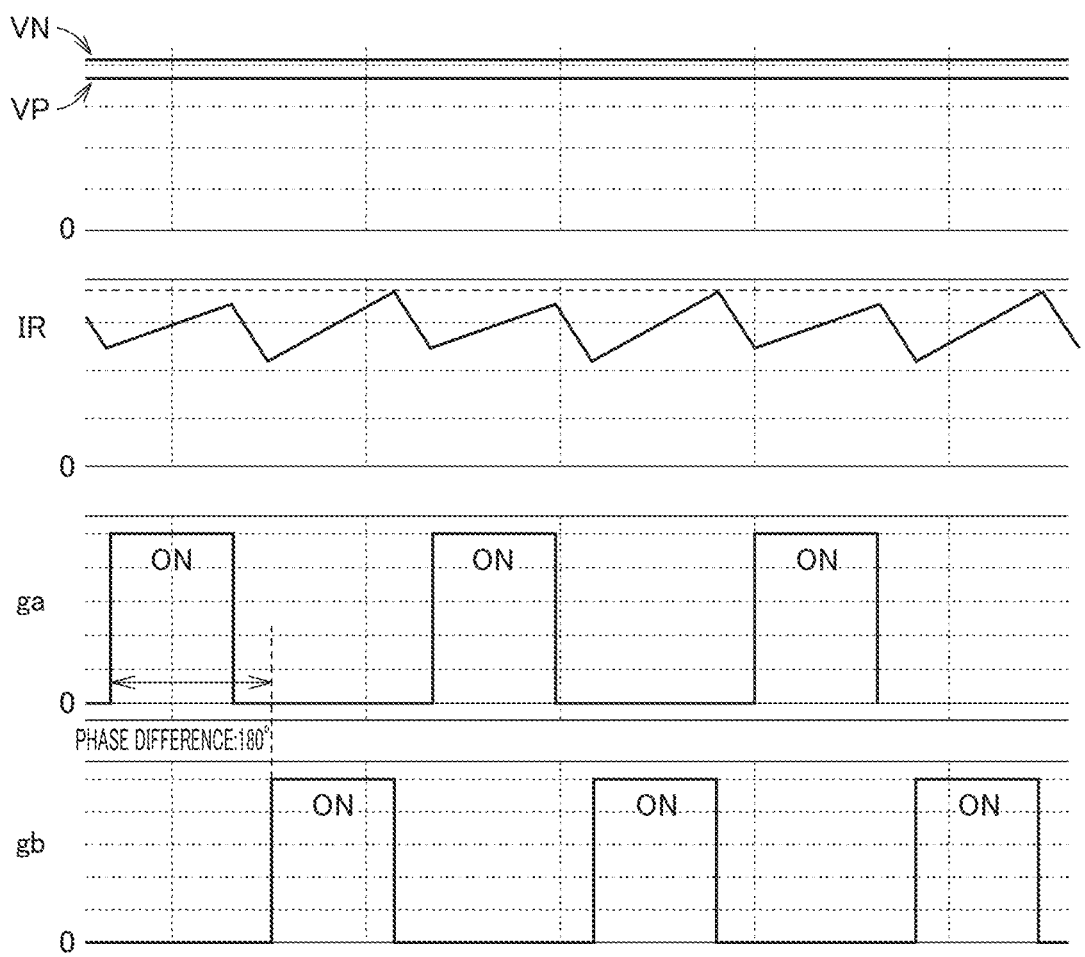
FIG. 7 is a diagram representing operation waveforms.

FIG. 7 is a diagram representing operation waveforms.

FIG. 7 shows operation waveforms with the ON-duty being less than 0.5 (V1/2>V2) when the capacitance of second input smoothing capacitor 2b is smaller than the capacitance of first input smoothing capacitor 2a by 10 [%].

Since a voltage VN across second input smoothing capacitor 2b is greater than a voltage VP across first input smoothing capacitor 2a, there is a difference between excitation energy to smoothing reactor 5 when first switching element 3a is turned on and excitation energy to smoothing reactor 5 when second switching element 3b is turned on. As a result, distortion or fluctuation occurs in smoothing reactor current IR.

When an inductance of smoothing reactor 5 is L, an excitation voltage of smoothing reactor 5 is V, a smoothing reactor current is IR, and an excitation time is T, the following relation is satisfied:

$$L \times IR = V \times T \quad (1)$$

Note that L is a constant value. Note that T does not vary because an ON-time of first switching element 3a and an ON-time of second switching element 3b (ON-duties) are the same. Thus, a condition under which smoothing reactor current IR varies depends on excitation voltage V. Excitation voltage V is switched to VP or VN due to switching of first switching element 3a and second switching element 3b. When VN is greater than VP, therefore, the excitation voltage is greater when second switching element 3b is turned on. Thus, a slope of smoothing reactor current IR when second switching element 3b is turned on is steeper than a slope of smoothing reactor current IR when first switching element 3a is turned on. This causes the occurrence of fluctuation in smoothing reactor current IR as described above.

When the input voltages are imbalanced in this manner, the double step-down chopper circuit may be stopped by a protective operation, or a voltage equal to or greater than the rating may be applied to first input smoothing capacitor 2a and second input smoothing capacitor 2b. It is also concerned that a ripple current of second input smoothing capacitor 2b may increase to accelerate deterioration of second input smoothing capacitor 2b.

To address such problems, the double step-down chopper circuit in the present embodiment includes first input voltage detection unit 10a, second input voltage detection unit 10b, input voltage comparison unit 11, and phase difference correction control unit 12.

First input voltage detection unit 10a detects voltage VP across first input smoothing capacitor 2a (first input voltage). First input voltage detection unit 10a transmits a signal representing detected voltage VP to input voltage comparison unit 11.

Second input voltage detection unit 10b detects voltage VN across second input smoothing capacitor 2b (second input voltage). Second input voltage detection unit 10b transmits a signal representing detected voltage VN to input voltage comparison unit 11.

Input voltage comparison unit 11 compares voltage VP across first input smoothing capacitor 2a with voltage VN across second input smoothing capacitor 2b.

Phase difference correction control unit 12 determines a phase difference to be corrected based on a result of comparison at input voltage comparison unit 11, and transmits a signal representing the determined phase difference to be corrected to switching control unit 9.

Switching control unit 9 determines, based on the phase difference to be corrected, a phase of gate signal ga to first switching element 3a that is being generated and a phase of gate signal gb to second switching element 3b that is being generated. Switching control unit 9 switches first switching element 3a and second switching element 3b based on gate signals ga and gb whose phases have been determined.

First, an operation when VP<VN is satisfied will be described.

The phase of switching of second switching element 3b is delayed from the phase of switching of first switching element 3a by the difference between the cycle of first switching element 3a and the cycle of second switching element 3b (=180°). In this state, when it is detected that VP<VN is satisfied, phase difference correction control unit 12 corrects, based on the voltage difference (VN−VP), the difference between the phase of switching of first switching element 3a and the phase of switching of second switching element 3b to the difference between the cycle of first switching element 3a and the cycle of second switching element 3b (=180°)−θ. The magnitude of the amount of correction θ can be varied depending on the voltage difference (VN−VP). For example, the magnitude of the amount of correction θ may be proportional to the voltage difference (VN−VP).

Switching control unit 9 corrects the phase of switching of second switching element 3b by advancing the phase by θ. As a result, the phase of switching of second switching element 3b is delayed from the phase of switching of first switching element 3a by the difference between the cycle of first switching element 3a and the cycle of second switching element 3b (=180°)−θ.

Figure 8:
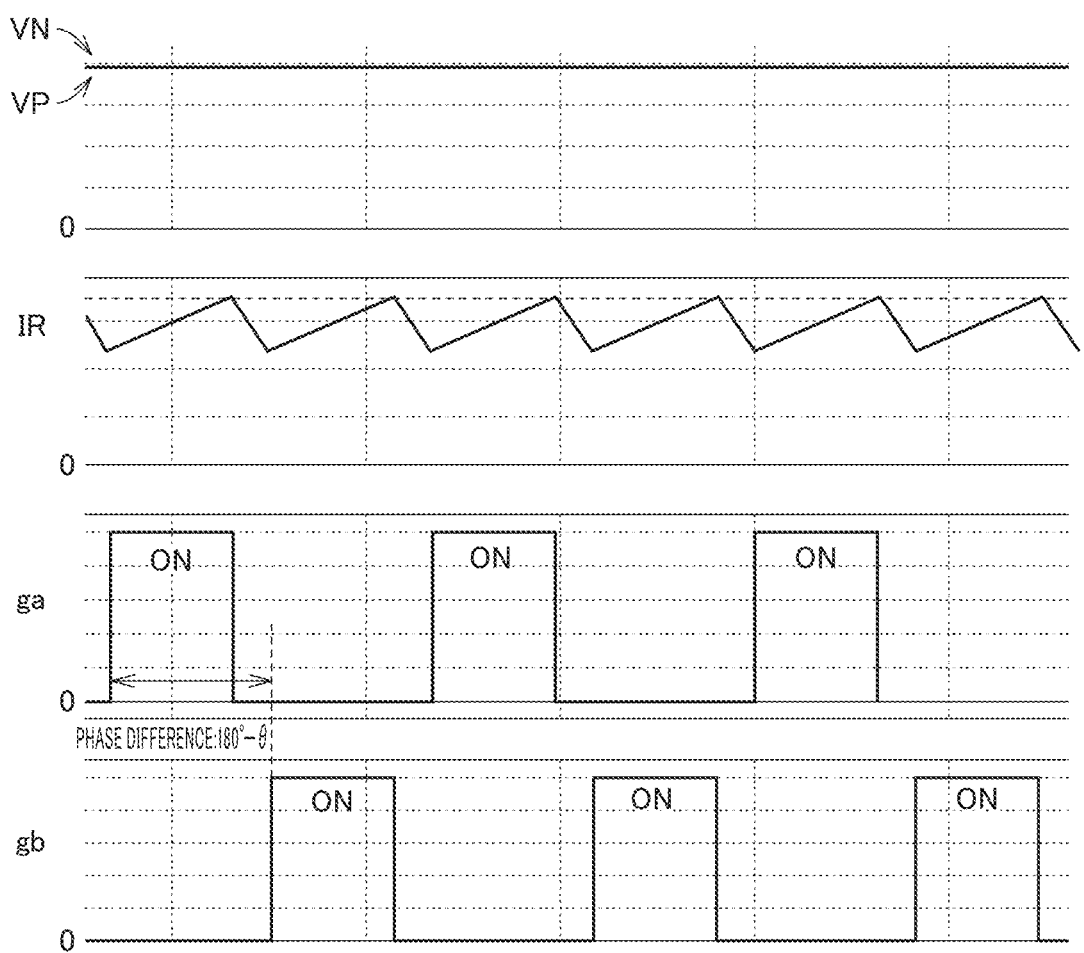
FIG. 8 is a diagram representing operation waveforms after a phase of switching of a second switching element 3b has been corrected.

FIG. 8 is a diagram representing operation waveforms after the phase of switching of second switching element 3b has been corrected.

As the phase of switching of second switching element 3b has been corrected by being advanced, a freewheeling time after first switching element 3a has been turned off is shortened, while a freewheeling time after second switching element 3b has been turned off is lengthened.

Namely, when first switching element 3a is turned on, a de-excitation time is shortened for excitation energy stored in smoothing reactor 5 by first input voltage VP. The amount of released energy is thereby reduced. When second switching element 3b is turned on, a de-excitation time is lengthened for excitation energy stored in smoothing reactor 5 by second input voltage VN. The amount of released energy is thereby increased. Accordingly, the load is reduced (the voltage is increased) at smaller voltage VP across first input smoothing capacitor 2a, and the load is increased (the voltage is reduced) at greater voltage VN across second input smoothing capacitor 2b. As a result, both excitation energies are balanced. Namely, by a phase difference that achieves equivalent loads when viewed from first input voltage VP and second input voltage VN, first input voltage VP and second input voltage VN are balanced.

A similar effect can be produced not only by performing the phase-advancing correction on second switching element 3b as described above, but also by performing a phase-delaying correction (0°+θ) on first switching element 3a. That is, switching control unit 9 corrects the phase of switching of first switching element 3a by delaying the phase by θ. As a result, the phase of switching of second switching element 3b is delayed from the phase of switching of first switching element 3a by the difference between the cycle of first switching element 3a and the cycle of second switching element 3b (=180°)−θ.

Next, an operation when VP>VN is satisfied will be described.

The phase of switching of second switching element 3b is delayed from the phase of switching of first switching element 3a by the difference between the cycle of first switching element 3a and the cycle of second switching element 3b (=180°). In this state, when it is detected that VP>VN is satisfied, phase difference correction control unit 12 corrects, based on the voltage difference (VP−VN), the difference between the phase of switching of first switching element 3a and the phase of switching of second switching element 3b to the difference between the cycle of first switching element 3a and the cycle of second switching element 3b (=180°)+θ. The magnitude of the amount of correction θ can be varied depending on the voltage difference (VP−VN). For example, the magnitude of the amount of correction θ may be proportional to the voltage difference (VP−VN).

For example, switching control unit 9 corrects the phase of switching of second switching element 3b by delaying the phase by θ. As a result, the phase of switching of second switching element 3b is delayed from the phase of switching of first switching element 3a by the difference between the cycle of first switching element 3a and the cycle of second switching element 3b (=180°)+θ.

As the phase of switching of second switching element 3b has been corrected by being delayed, the freewheeling time after second switching element 3b has been turned off is shortened, and the freewheeling time after first switching element 3a has been turned off is lengthened.

Namely, when first switching element 3a is turned on, the de-excitation time is lengthened for excitation energy stored in smoothing reactor 5 by first input voltage VP. The amount of released energy is thereby increased. When second switching element 3b is turned on, the de-excitation time is shortened for excitation energy stored in smoothing reactor 5 by second input voltage VN. The amount of released energy is thereby reduced. Accordingly, the load is reduced (the voltage is increased) at smaller voltage VN across second input smoothing capacitor 2b, and the load is increased (the voltage is reduced) at greater voltage VP across first input smoothing capacitor 2a. As a result, both excitation energies are balanced. Namely, by a phase difference that achieves equivalent loads when viewed from first input voltage VP and second input voltage VN, first input voltage VP and second input voltage VN are balanced.

A similar effect can be produced not only by performing the phase-delaying correction on second switching element 3b as described above, but also by performing a phase-advancing correction (0°−θ) on first switching element 3a. That is, switching control unit 9 corrects the phase of switching of first switching element 3a by advancing the phase by θ. As a result, the phase of switching of second switching element 3b is delayed from the phase of switching of first switching element 3a by the difference between the cycle of first switching element 3a and the cycle of second switching element 3b (=180°)+θ.

As described above, according to the present embodiment, when variation occurs between the capacitance of first input smoothing capacitor 2a and the capacitance of second input smoothing capacitor 2b, the imbalance between voltage VP across first input smoothing capacitor 2a and voltage VN across second input smoothing capacitor 2b is eliminated. Accordingly, a situation can be avoided where an air-conditioning system is stopped, for example, by a protective function provided to protect first input smoothing capacitor 2a and second input smoothing capacitor 2b from overvoltage. A situation can also be avoided where a voltage equal to or greater than the rated voltage is applied to first input smoothing capacitor 2a and second input smoothing capacitor 2b.

There is also no need to provide a capacitor having a high breakdown voltage, or provide a plurality of capacitors, for the occurrence of imbalance between first input voltage VP and second input voltage VN. As a result, the air-conditioning apparatus can be reduced in size and cost, for example.

The elimination of imbalance between first input voltage VP and second input voltage VN also solves the problem of increased ripple current of an input smoothing capacitor having a reduced capacitance, which accelerates deterioration of the capacitor.

Embodiment 2

Figure 9:
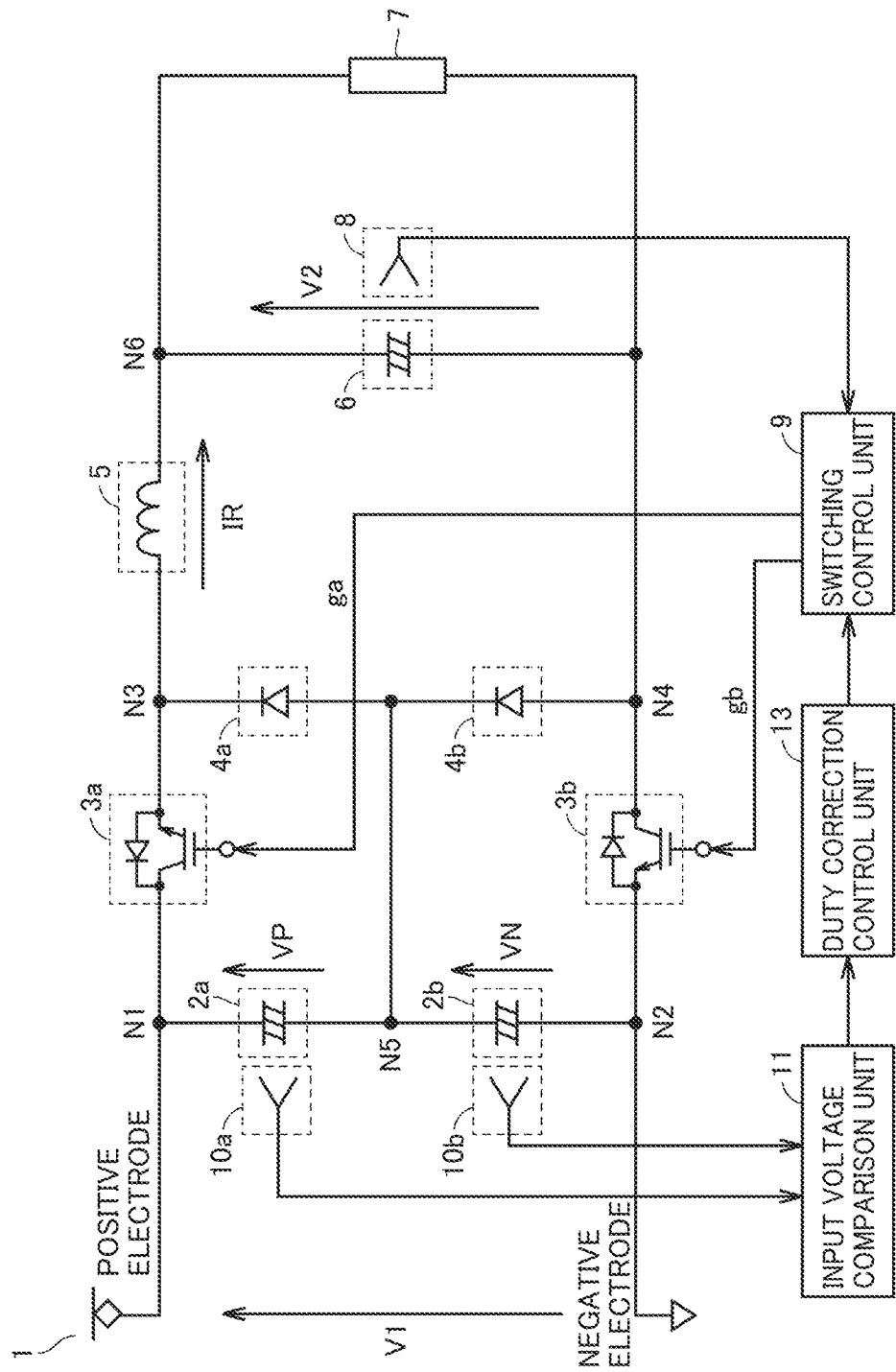
FIG. 9 is a diagram representing a configuration of a double step-down chopper circuit in Embodiment 2.

FIG. 9 is a diagram representing a configuration of a double step-down chopper circuit in Embodiment 2.

The double step-down chopper circuit in Embodiment 2 includes a duty correction control unit 13, instead of phase difference correction control unit 12 included in the double step-down chopper circuit in Embodiment 1. The double step-down chopper circuit in the embodiment is similar in basic circuit configuration and control to the double step-down chopper circuit in Embodiment 1.

First, as an initial state, the ON-duty of switching of first switching element 3a and the ON-duty of switching of second switching element 3b are set to a same value D. ON-duty D is determined by output voltage detection unit 8 and switching control unit 9 performing feedback control such that output voltage V2 reaches a desired voltage.

As in Embodiment 1, first input voltage detection unit 10a detects voltage VP across first input smoothing capacitor 2a. Second input voltage detection unit 10b detects voltage VN across second input smoothing capacitor 2b. Input voltage comparison unit 11 compares voltage VP across first input smoothing capacitor 2a with voltage VN across second input smoothing capacitor 2b.

Duty correction control unit 13 determines, based on the voltage difference calculated at input voltage comparison unit 11, an amount of correction Δd1 of the ON-duty of switching of first switching element 3a and an amount of correction Δd2 of the ON-duty of switching of second switching element 3b.

Switching control unit 9 switches first switching element 3a and second switching element 3b based on amounts of correction Δd1 and Δd2. Amount of correction Δd1 and amount of correction Δd2 can be equal in absolute value and different in sign.

When VN>VP is satisfied, duty correction control unit 13 corrects the ON-duty of switching of first switching element 3a by shortening the ON-duty, and corrects the ON-duty of switching of second switching element 3b by lengthening the ON-duty, based on the voltage difference (VN−VP). When VP>VN is satisfied, duty correction control unit 13 corrects the ON-duty of switching of first switching element 3a by lengthening the ON-duty, and corrects the ON-duty of switching of second switching element 3b by shortening the ON-duty, based on the voltage difference (VP−VN).

For example, an operation will be described when an imbalance has occurred between VP and VN when ON-duty D is 0.4 before being corrected.

First, an operation when VP<VN is satisfied will be described.

For example, Δd1=−0.01 and Δd2=0.01 can be set. That is, duty correction control unit 13 corrects the ON-duty of switching of first switching element 3a to 0.39, and corrects the ON-duty of switching of second switching element 3b to 0.41. Namely, duty correction control unit 13 shortens the ON-duty of switching of first switching element 3a and lengthens the ON-duty of switching of second switching element 3b by the same amount of 0.01 with respect to ON-duty D=0.4 before being corrected.

By correcting the ON-duty of switching of first switching element 3a and the ON-duty of switching of second switching element 3b in this manner, the following effect is produced.

The ON-time of first switching element 3a is shortened, and the excitation energy to smoothing reactor 5 by first input voltage VP decreases. As a result, the load appears to be reduced when viewed from first input voltage VP, causing first input voltage VP to increase. On the other hand, the ON-time of second switching element 3b is lengthened, and the excitation energy to smoothing reactor 5 by second input voltage VN increases. As a result, the load appears to be increased when viewed from second input voltage VN, causing second input voltage VN to decrease. As a result, while the excitation time of smoothing reactor 5 by the ON-time of first switching element 3a is shortened, the excitation voltage increases. On the other hand, while the excitation time of smoothing reactor 5 by the ON-time of second switching element 3b is lengthened, the excitation voltage decreases. Both excitation energies are balanced in a manner described above. Namely, by the ON-duties that achieve equivalent loads when viewed from first input voltage VP and second input voltage VN, first input voltage VP and second input voltage VN are balanced.

Next, an operation when VP>VN is satisfied will be described.

For example, Δd1=0.01 and Δd2=−0.01 can be set. That is, duty correction control unit 13 corrects the ON-duty of switching of first switching element 3a to 0.41, and corrects the ON-duty of switching of second switching element 3b to 0.39. Namely, duty correction control unit 13 lengthens the ON-duty of switching of first switching element 3a and shortens the ON-duty of switching of second switching element 3b by the same amount of 0.01 with respect to ON-duty D=0.4 before being corrected.

By correcting the ON-duty of switching of first switching element 3a and the ON-duty of switching of second switching element 3b in this manner, the following effect is produced.

The ON-time of first switching element 3a is lengthened, and the excitation energy to smoothing reactor 5 by first input voltage VP increases. As a result, the load appears to be increased when viewed from first input voltage VP, causing first input voltage VP to decrease. On the other hand, the ON-time of second switching element 3b is shortened, and the excitation energy to smoothing reactor 5 by second input voltage VN decreases. As a result, the load appears to be reduced when viewed from second input voltage VN, causing second input voltage VN to increase. As a result, while the excitation time of smoothing reactor 5 by the ON-time of first switching element 3a is lengthened, the excitation voltage decreases. On the other hand, while the excitation time of smoothing reactor 5 by the ON-time of second switching element 3b is shortened, the excitation voltage increases. Both excitation energies are balanced in a manner described above. Namely, by the ON-duties that achieve equivalent loads when viewed from first input voltage VP and second input voltage VN, first input voltage VP and second input voltage VN are balanced.

As described above, according to the present embodiment, when variation occurs between the capacitance of first input smoothing capacitor 2a and the capacitance of second input smoothing capacitor 2b, the imbalance between voltage VP across first input smoothing capacitor 2a (first input voltage) and voltage VN across second input smoothing capacitor 2b (second input voltage) is eliminated. Accordingly, a situation can be avoided where the air-conditioning system is stopped, for example, by the protective function provided to protect first input smoothing capacitor 2a and second input smoothing capacitor 2b from overvoltage. A situation can also be avoided where a voltage equal to or greater than the rated voltage is applied to first input smoothing capacitor 2a and second input smoothing capacitor 2b.

There is also no need to provide a capacitor having a high breakdown voltage, or provide a plurality of capacitors, for the occurrence of imbalance between first input voltage VP and second input voltage VN. As a result, the air-conditioning apparatus can be reduced in size and cost, for example.

The elimination of imbalance between first input voltage VP and second input voltage VN also solves the problem of increased ripple current of an input smoothing capacitor having a reduced capacitance, which accelerates deterioration of the capacitor.

Embodiment 3

Figure 10:
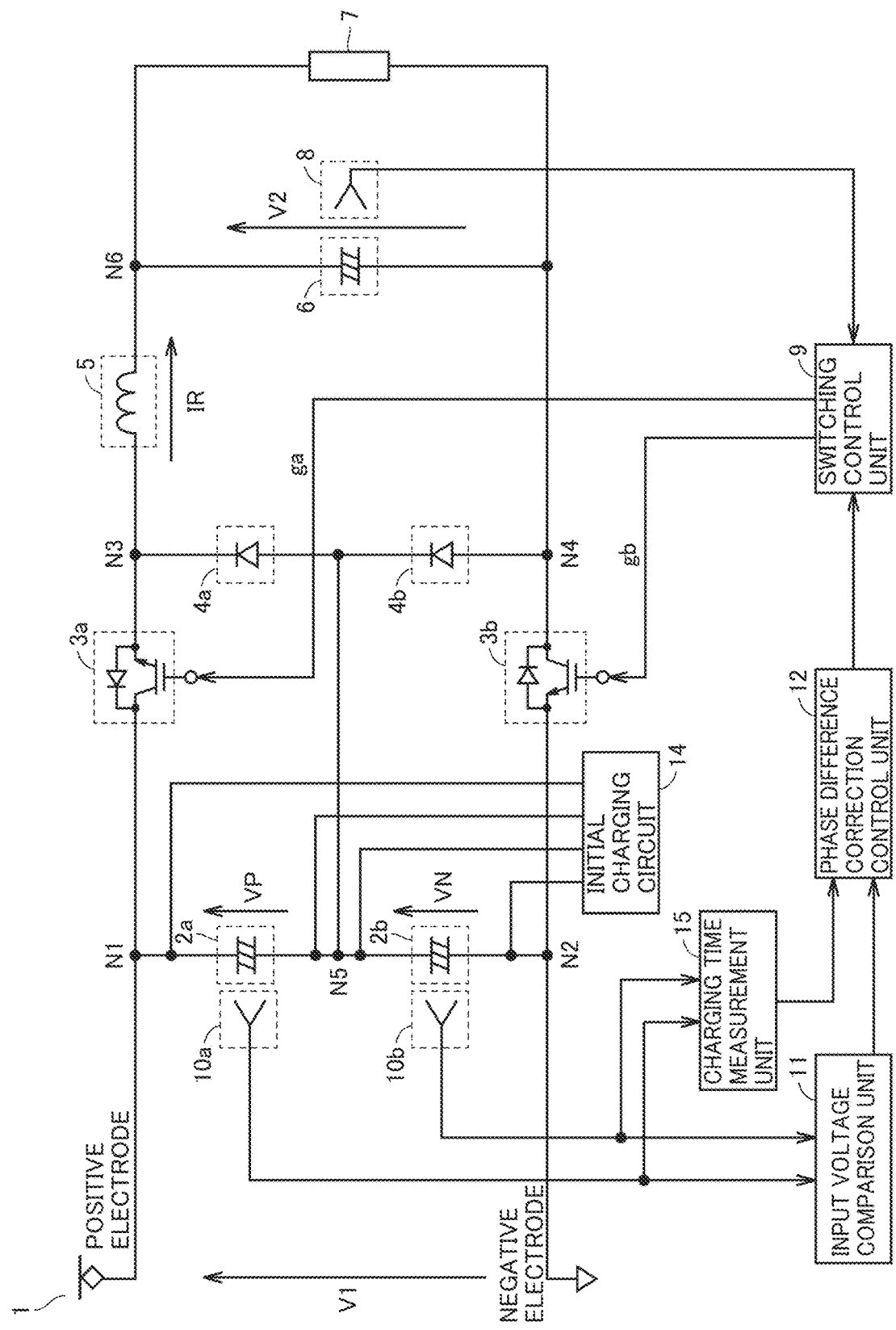
FIG. 10 is a diagram representing a configuration of a double step-down chopper circuit in Embodiment 3.

FIG. 10 is a diagram representing a configuration of a double step-down chopper circuit in Embodiment 3.

The double step-down chopper circuit in Embodiment 3 includes an initial charging circuit 14 and a charging time measurement unit 15, in addition to the components of the double step-down chopper circuit in Embodiment 1.

Initial charging circuit 14 is a constant voltage/constant current (CVCC) circuit, for example. Initial charging circuit 14 charges first input smoothing capacitor 2a and second input smoothing capacitor 2b when the double step-down chopper starts to operate, to bring voltage VP across first input smoothing capacitor 2a and voltage VN across second input smoothing capacitor 2b to a prescribed voltage VM.

Charging time measurement unit 15 measures a time Ta over which voltage VP across first input smoothing capacitor 2a is charged to prescribed voltage VM, and a time Tb over which voltage VN across second input smoothing capacitor 2b is charged to prescribed voltage VM.

When there is a difference between the capacitance of first input smoothing capacitor 2a and the capacitance of second input smoothing capacitor 2b, charging times Ta and Tb are different. A capacitor having a lower capacitance has a shorter charging time. Even if there is a difference between the capacitance of first input smoothing capacitor 2a and the capacitance of second input smoothing capacitor 2b, control is performed with a constant voltage value (CV) by initial charging circuit 14, so that the voltage imbalance is prevented before start-up of the double step-down chopper circuit.

By performing the phase corrections in Embodiment 1 and the ON-duty corrections in Embodiment 2 in advance based on results of measurement of charging times Ta and Tb, the voltage imbalance can be suppressed before start-up and immediately after start-up of the double step-down chopper circuit.

In addition, before start-up of the double step-down chopper circuit, the degree of deterioration in capacitance and abnormality such as a failure of first input smoothing capacitor 2a and second input smoothing capacitor 2b can be detected, leading to improved reliability of the double step-down chopper circuit.

While the configuration of measuring the charging times of first input smoothing capacitor 2a and second input smoothing capacitor 2b is added to Embodiment 1 in the embodiment described above, this is not restrictive. A similar effect can also be produced by adding a similar configuration for measuring the charging times of first input smoothing capacitor 2a and second input smoothing capacitor 2b to Embodiment 2.

Embodiment 4

Figure 11:
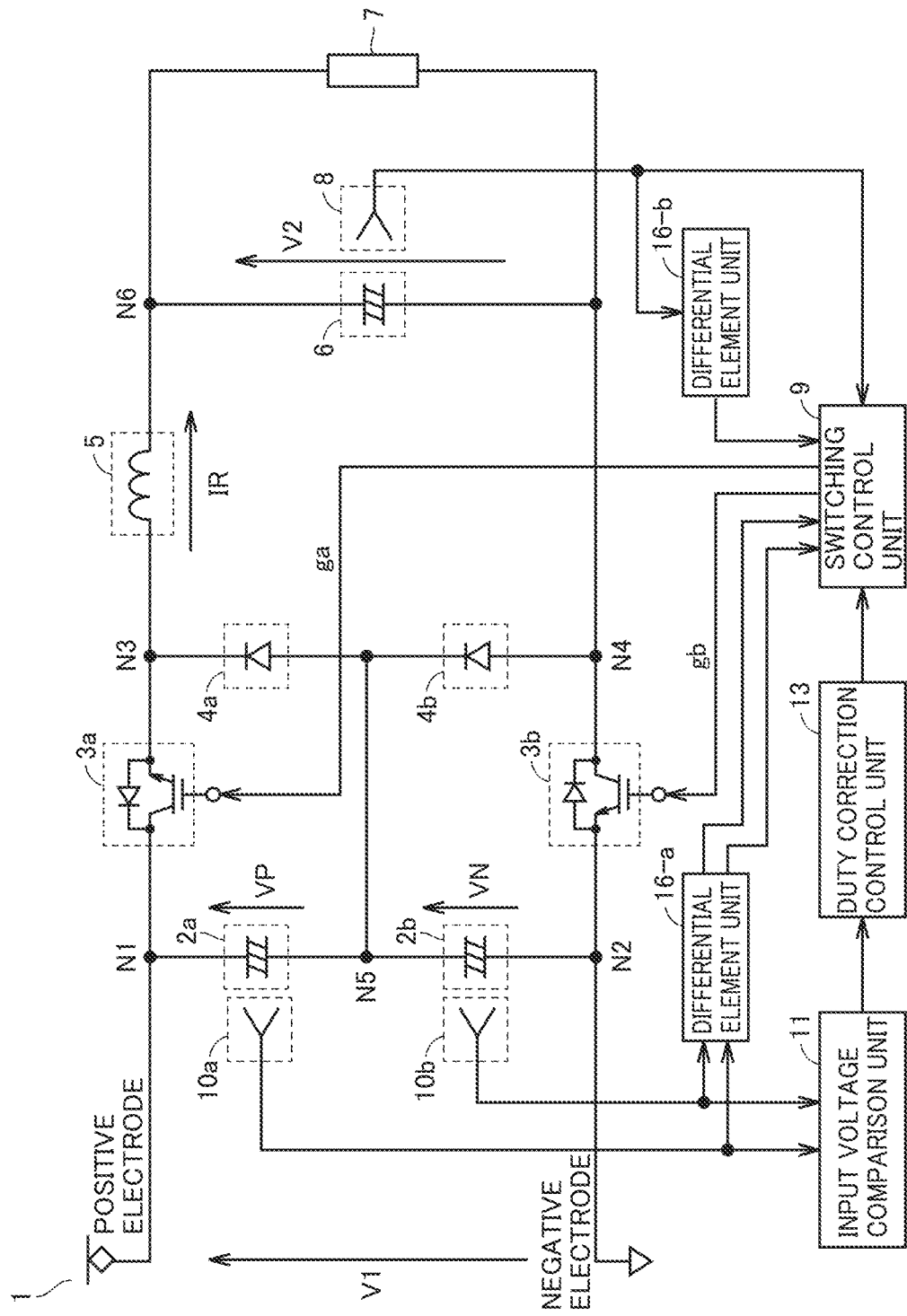
FIG. 11 is a diagram representing a configuration of a double step-down chopper circuit in Embodiment 4.

FIG. 11 is a diagram representing a configuration of a double step-down chopper circuit in Embodiment 4.

The double step-down chopper circuit in Embodiment 4 includes differential element units 16 at stages following output voltage detection unit 8, first input voltage detection unit 10a, and second input voltage detection unit 10b, in addition to the components of the double step-down chopper circuit in Embodiment 1.

A differential element unit 16-a differentiates voltage VP across first input smoothing capacitor 2a detected by first input voltage detection unit 10a, to detect a current flowing through first input smoothing capacitor 2a. Differential element unit 16-a differentiates voltage VN across second input smoothing capacitor 2b detected by second input voltage detection unit 10b, to detect a current flowing through second input smoothing capacitor 2b.

A differential element unit 16-b differentiates the voltage of output smoothing capacitor 6 detected by output voltage detection unit 8, to detect a current flowing through output smoothing capacitor 6.

When a capacity of a capacitor is c, a voltage of the capacitor is v, and an instantaneous current flowing through the capacitor is i, the following expression is satisfied:

$$i = c \times dv/dt \quad (2)$$

Therefore, current i flowing through the capacitor can be detected from a differential value of voltage V of the capacitor.

Differential element units 16-a and 16-b can each be implemented by an approximate differentiation circuit having a transfer function expressed in the following expression, for example:

$$D = sT/(1+sT/K) \quad (3)$$

Figure 12:
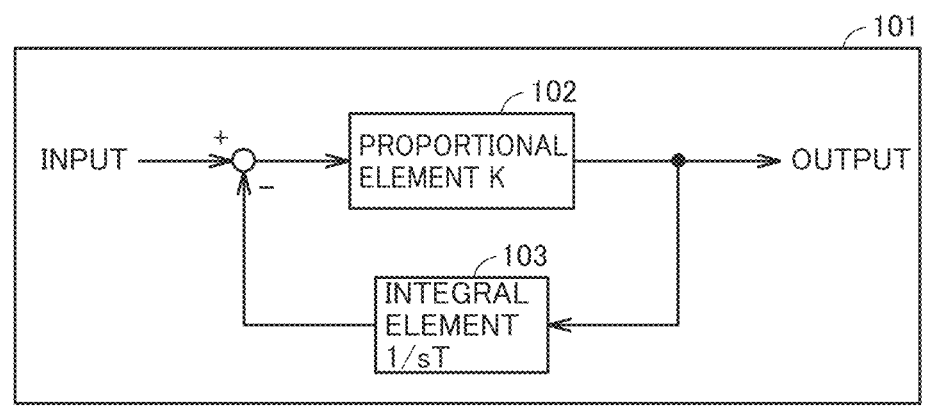
FIG. 12 is a block diagram of an approximate differentiation circuit.

FIG. 12 is a block diagram of the approximate differentiation circuit.

As shown in FIG. 12, the approximate differentiation circuit can be implemented by providing a feedback loop by means of an integral element (1/sT) 103 for a proportional element (K) 102.

The approximate differentiation circuit can also be implemented by an electronic component such as an operational amplifier, or by software by capturing a voltage signal into a microcomputer and the like.

Switching control unit 9 may be implemented by a microcomputer because it generates a switching signal. By capturing a signal representing a voltage of a capacitor into the microcomputer implementing switching control unit 9, and by implementing the approximate differentiation circuit within the microcomputer, a current flowing through the capacitor can be detected without additional components.

By differential element units 16, currents flowing through capacitors 2a, 2b and 6 can be detected without the need to add current sensors for detecting the currents flowing through capacitors 2a, 2b and 6. Accordingly, when an abnormal current that causes a sudden voltage change flows through capacitors 2a, 2b and 6, the operation of the double step-down chopper circuit can be stopped. As a result, the reliability of the double step-down chopper circuit is improved.

While the configuration for detecting abnormal current is added to Embodiment 1 in the embodiment described above, this is not restrictive. A similar effect can also be produced by adding a similar configuration for detecting abnormal current to Embodiment 2 or Embodiment 3.

Embodiment 5

A double step-down chopper circuit in Embodiment 5 operates in a stable manner even if the switching cycle of first switching element 3a and the switching cycle of second switching element 3b are shifted by 180° (half cycle)±α due to variation in the switching elements or circuit constants, for example.

When a phase shift (±α) occurs with respect to the shift of 180° between the switching cycle of first switching element 3a and the switching cycle of second switching element 3b, a voltage imbalance due to the phase shift occurs between voltage VP across first input smoothing capacitor 2a and voltage VN across second input smoothing capacitor 2b, even if first input smoothing capacitor 2a and second input smoothing capacitor 2b have the same capacitance and the same ON-duty.

Thus, in a conventional double step-down chopper circuit not including first input voltage detection unit 10a, second input voltage detection unit 10b, input voltage comparison unit 11, and phase difference correction control unit 12, the imbalance between the input voltages due to the occurrence of the phase shift (±θ) cannot be suppressed. In the present embodiment, on the other hand, the phases are corrected by detecting also the imbalance between the input voltages due to the phase shift (±α). Accordingly, even if the phrases are shifted such as due to variation in the switching elements and circuit constants, the circuit can be operated in a stable manner without an imbalance between the input voltages. In the present embodiment, even if an imbalance occurs due to the difference between the capacitances of input smoothing capacitors 2a and 2b, in addition to the phase shift (±α), control is performed by correcting the phases with reference to the phase shift (180°±α), thereby causing no malfunction in operation. Namely, in the present embodiment, the control can be performed whether the difference between the switching cycle of first switching element 3a and the switching cycle of second switching element 3b is 180° or not.

That is, in the present embodiment, phase correction control unit 12 corrects the phases in a manner described below.

When the phase of switching of second switching element 3b is delayed from the phase of switching of first switching element 3a by the difference between the cycle of first switching element 3a and the cycle of second switching element 3b (180°±α), and it is detected that the voltage across first input smoothing capacitor 2a is smaller than the voltage across second input smoothing capacitor 2b, phase difference correction control unit 12 corrects the phase of switching of second switching element 3b by advancing the phase.

When the phase of switching of second switching element 3b is delayed from the phase of switching of first switching element 3a by the difference between the cycle of first switching element 3a and the cycle of second switching element 3b (180°±α), and it is detected that the voltage across first input smoothing capacitor 2a is smaller than the voltage across second input smoothing capacitor 2b, phase difference correction control unit 12 corrects the phase of switching of first switching element 3a by delaying the phase.

When the phase of switching of second switching element 3b is delayed from the phase of switching of first switching element 3a by the difference between the cycle of first switching element 3a and the cycle of second switching element 3b (180°±α), and it is detected that the voltage across first input smoothing capacitor 2a is greater than the voltage across second input smoothing capacitor 2b, phase difference correction control unit 12 corrects the phase of switching of second switching element 3b by delaying the phase.

When the phase of switching of second switching element 3b is delayed from the phase of switching of first switching element 3a by the difference between the cycle of first switching element 3a and the cycle of second switching element 3b (180°±α), and it is detected that the voltage across first input smoothing capacitor 2a is greater than the voltage across second input smoothing capacitor 2b, phase difference correction control unit 12 corrects the phase of switching of first switching element 3a by advancing the phase.

Embodiment 6

Figure 13:
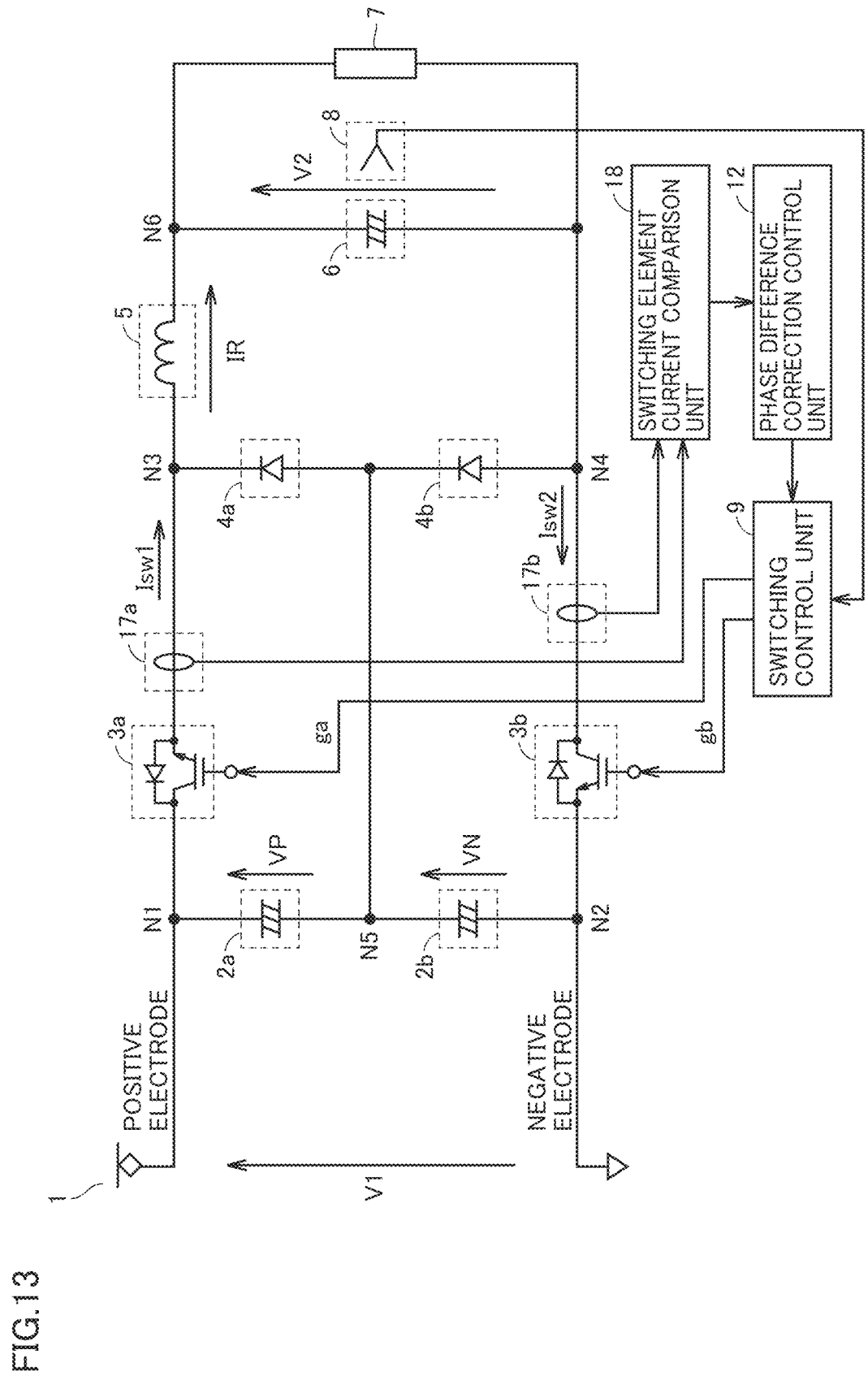
FIG. 13 is a diagram representing a configuration of a double step-down chopper circuit in Embodiment 6.

FIG. 13 is a diagram representing a circuit configuration of a double step-down chopper in Embodiment 6.

The double step-down chopper circuit in Embodiment 6 includes a first switching element current detection unit 17a, a second switching element current detection unit 17b, and a switching element current comparison unit 18, instead of first input voltage detection unit 10a, second input voltage detection unit 10b, and input voltage comparison unit 11 included in the double step-down chopper circuit in Embodiment 1. The double step-down chopper circuit in the present embodiment is similar in basic circuit configuration to the double step-down chopper circuit in Embodiment 1.

First switching element current detection unit 17a detects a current Isw1 of the first switching element. First switching element current detection unit 17a transmits a signal representing detected current Isw1 to switching element current comparison unit 18.

Second switching element current detection unit 17b detects a current Isw2 of the second switching element. Second switching element current detection unit 17b transmits a signal representing detected current Isw2 to switching element current comparison unit 18.

Switching element current comparison unit 18 compares current Isw1 of the first switching element with current Isw2 of the second switching element.

Figure 14:
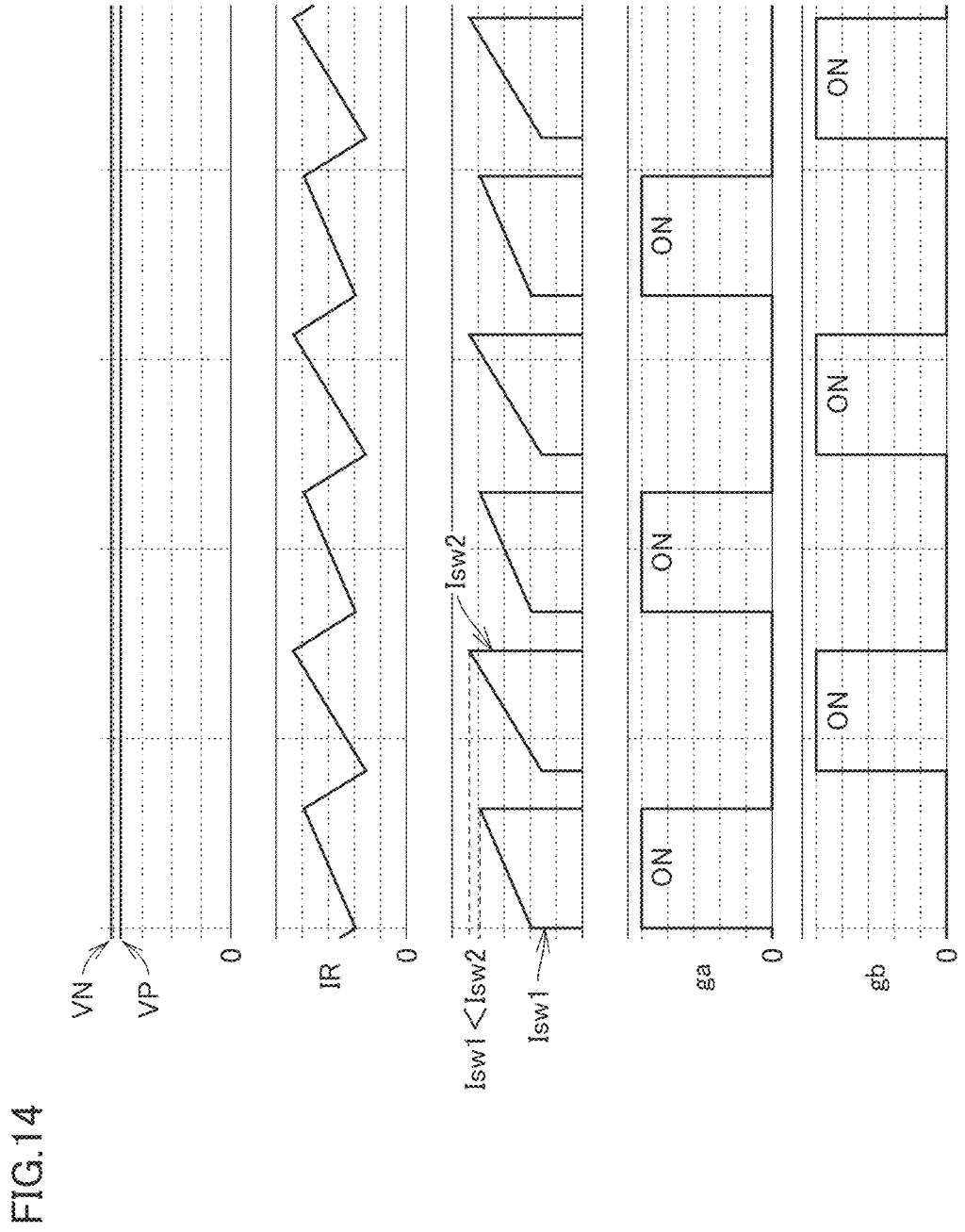
FIG. 14 is a diagram showing relation between VP and VN when there is a difference between a first switching element current Isw1 and a second switching element current Isw2.

When a result of comparison at switching element current comparison unit 18 shows that there is a difference between current Isw1 of the first switching element and current Isw2 of the second switching element as shown in FIG. 14, it can be assumed that an imbalance has occurred between voltage VP across first input smoothing capacitor 2a and voltage VN across second input smoothing capacitor 2b. Phase difference correction control unit 12 determines a phase difference to be corrected based on the result of comparison at switching element current comparison unit 18, and transmits a signal representing the determined phase difference to be corrected to switching control unit 9.

Switching control unit 9 determines, based on the phase difference to be corrected, a phase of gate signal ga to first switching element 3a that is being generated and a phase of gate signal gb to second switching element 3b that is being generated. Switching control unit 9 switches first switching element 3a and second switching element 3b based on gate signals ga and gb whose phases have been determined. When the result of comparison at switching element current comparison unit 18 shows Isw1<Isw2, it is assumed that VP<VN is satisfied, and when the result conversely shows Isw1>Isw2, it is assumed that VP>VN is satisfied. The operations when VP<VN and VP>VN are satisfied are similar to the operations described in Embodiment 1.

According to the present embodiment, when variation occurs between the capacitance of first input smoothing capacitor 2a and the capacitance of second input smoothing capacitor 2b, the imbalance between voltage VP across first input smoothing capacitor 2a (first input voltage) and voltage VN across second input smoothing capacitor 2b (second input voltage) is eliminated.

In addition, according to the present embodiment, since first switching element current Isw1 and second switching element current Isw2 can be directly monitored, when an abnormality occurs in a subsequent circuit to cause a flow of overcurrent through the switching elements, the overcurrent can be detected to immediately stop the switching (stop the operation of the double step-down chopper circuit). As a result, the reliability of the double step-down chopper circuit is improved (a failure of the apparatus can be suppressed).

Embodiment 7

Figure 15:
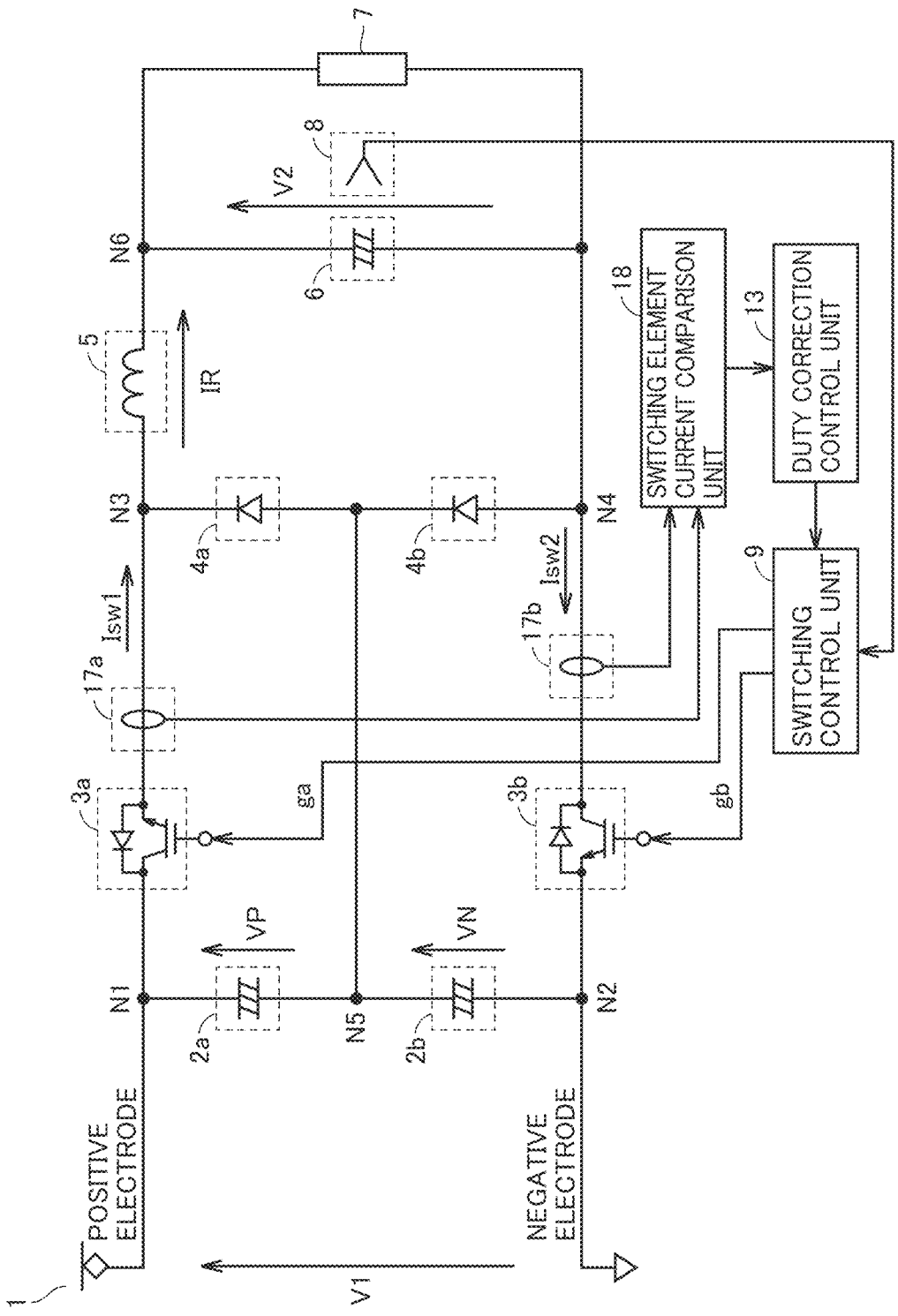
FIG. 15 is a diagram representing a configuration of a double step-down chopper circuit in Embodiment 7.

FIG. 15 is a diagram representing a circuit configuration of a double step-down chopper in Embodiment 7.

The double step-down chopper circuit in Embodiment 7 includes duty correction control unit 13, instead of phase difference correction control unit 12 included in the double step-down chopper circuit in Embodiment 6.

Duty correction control unit 13 determines, based on the current difference between first switching element current Isw1 and second switching element current Isw2 calculated at switching element current comparison unit 18, amount of correction Δd1 of the ON-duty of switching of first switching element 3a and amount of correction Δd2 of the ON-duty of switching of second switching element 3b.

Switching control unit 9 switches first switching element 3a and second switching element 3b based on amounts of correction Δd1 and Δd2. Amount of correction Δd1 and amount of correction Δd2 can be equal in absolute value and different in sign. When the result of comparison at switching element current comparison unit 18 shows Isw1<Isw2, it is assumed that VP<VN is satisfied, and when the result conversely shows Isw1>Isw2, it is assumed that VP>VN is satisfied. The operations when VP<VN and VP>VN are satisfied are similar to the operations described in Embodiment 2.

According to the present embodiment, when variation occurs between the capacitance of first input smoothing capacitor 2a and the capacitance of second input smoothing capacitor 2b, the imbalance between voltage VP across first input smoothing capacitor 2a (first input voltage) and voltage VN across second input smoothing capacitor 2b (second input voltage) is eliminated.

In addition, since first switching element current Isw1 and second switching element current Isw2 can be directly monitored, when an abnormality occurs in a subsequent circuit to cause a flow of overcurrent through the switching elements, the overcurrent can be detected to immediately stop the switching (stop the operation of the double step-down chopper circuit). As a result, the reliability of the double step-down chopper circuit is improved (a failure of the apparatus can be suppressed).

Embodiment 8

Figure 16:
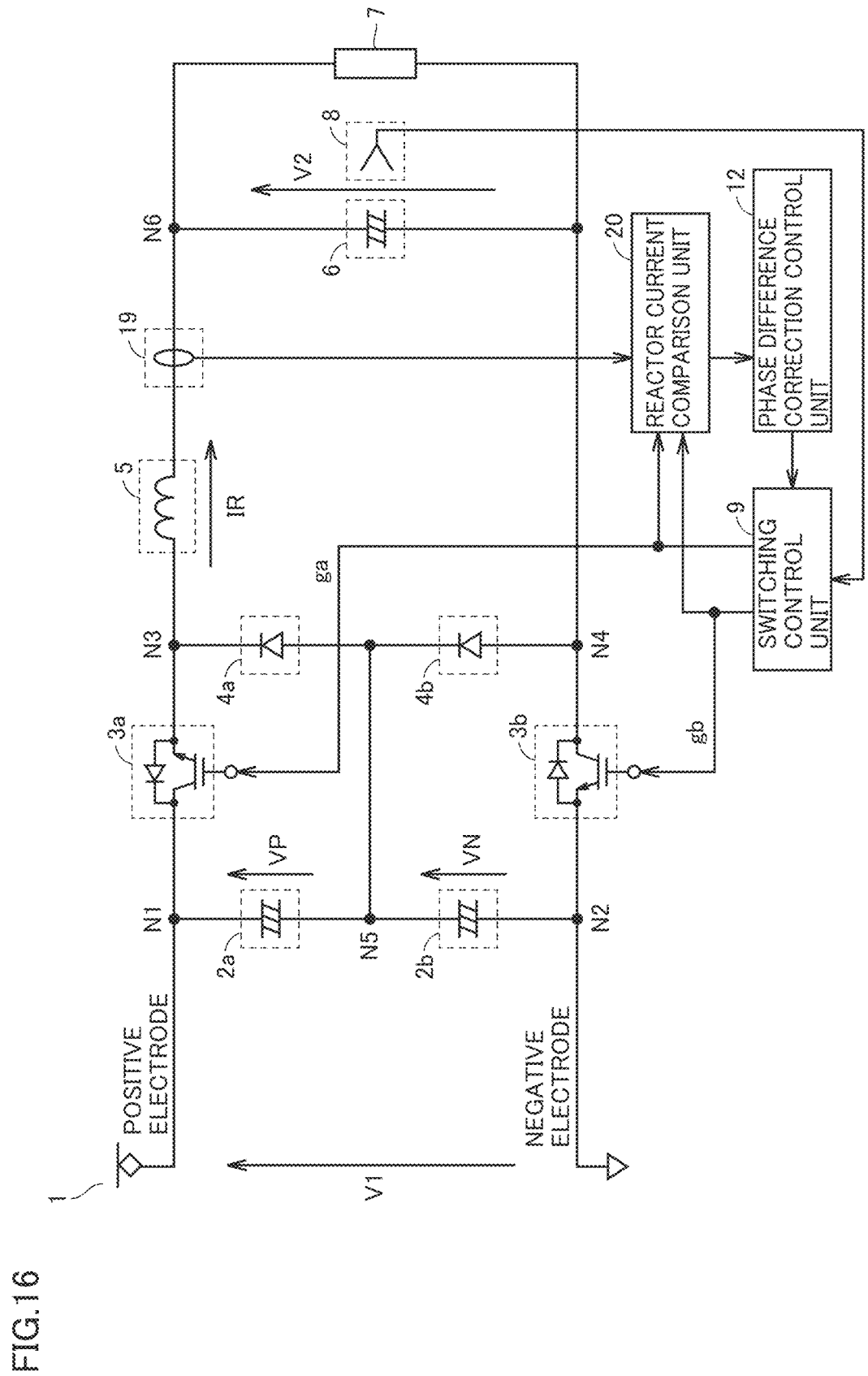
FIG. 16 is a diagram representing a configuration of a double step-down chopper circuit in Embodiment 8.

FIG. 16 is a diagram representing a circuit configuration of a double step-down chopper in Embodiment 8.

The double step-down chopper circuit in Embodiment 8 includes a reactor current detection unit 19 and a reactor current comparison unit 20, instead of first switching element current detection unit 17a, second switching element current detection unit 17b, and switching element current comparison unit 18 included in the double step-down chopper circuit in Embodiment 6.

Reactor current detection unit 19 detects a current flowing through smoothing reactor 5, and transmits a signal representing detected current IR to reactor current comparison unit 20.

Reactor current comparison unit 20 compares peak values of reactor current IR detected at reactor current detection unit 19 at timings when gate signals ga and gb of the first and second switching elements are turned on, and when there is a difference between the peak current values, it can be assumed that an imbalance has occurred between voltage VP across first input smoothing capacitor 2a and voltage VN across second input smoothing capacitor 2b. Phase difference correction control unit 12 determines a phase difference to be corrected based on the result of comparison at reactor current comparison unit 20, and transmits a signal representing the determined phase difference to be corrected to switching control unit 9. When the peak current when ga is turned on is smaller than the peak current when gb is turned on, it is assumed that VP<VN is satisfied, and, conversely, when the peak current when ga is turned on is greater than the peak current when gb is turned on, it is assumed that VP>VN is satisfied. The operations when VP<VN and VP>VN are satisfied are similar to the operations described in Embodiment 1.

According to the present embodiment, when variation occurs between the capacitance of first input smoothing capacitor 2a and the capacitance of second input smoothing capacitor 2b, the imbalance between voltage VP across first input smoothing capacitor 2a (first input voltage) and voltage VN across second input smoothing capacitor 2b (second input voltage) is eliminated.

In addition, since reactor current IR can be directly monitored, when an abnormal current flows through the reactor due to magnetic saturation of the reactor, for example, the abnormal current can be detected to immediately stop the switching (stop the operation of the double step-down chopper circuit). As a result, the reliability of the double step-down chopper circuit is improved (a failure of the apparatus can be suppressed).

In addition, since the current needs to be detected at only one location, the apparatus can be reduced in size and cost.

Embodiment 9

Figure 17:
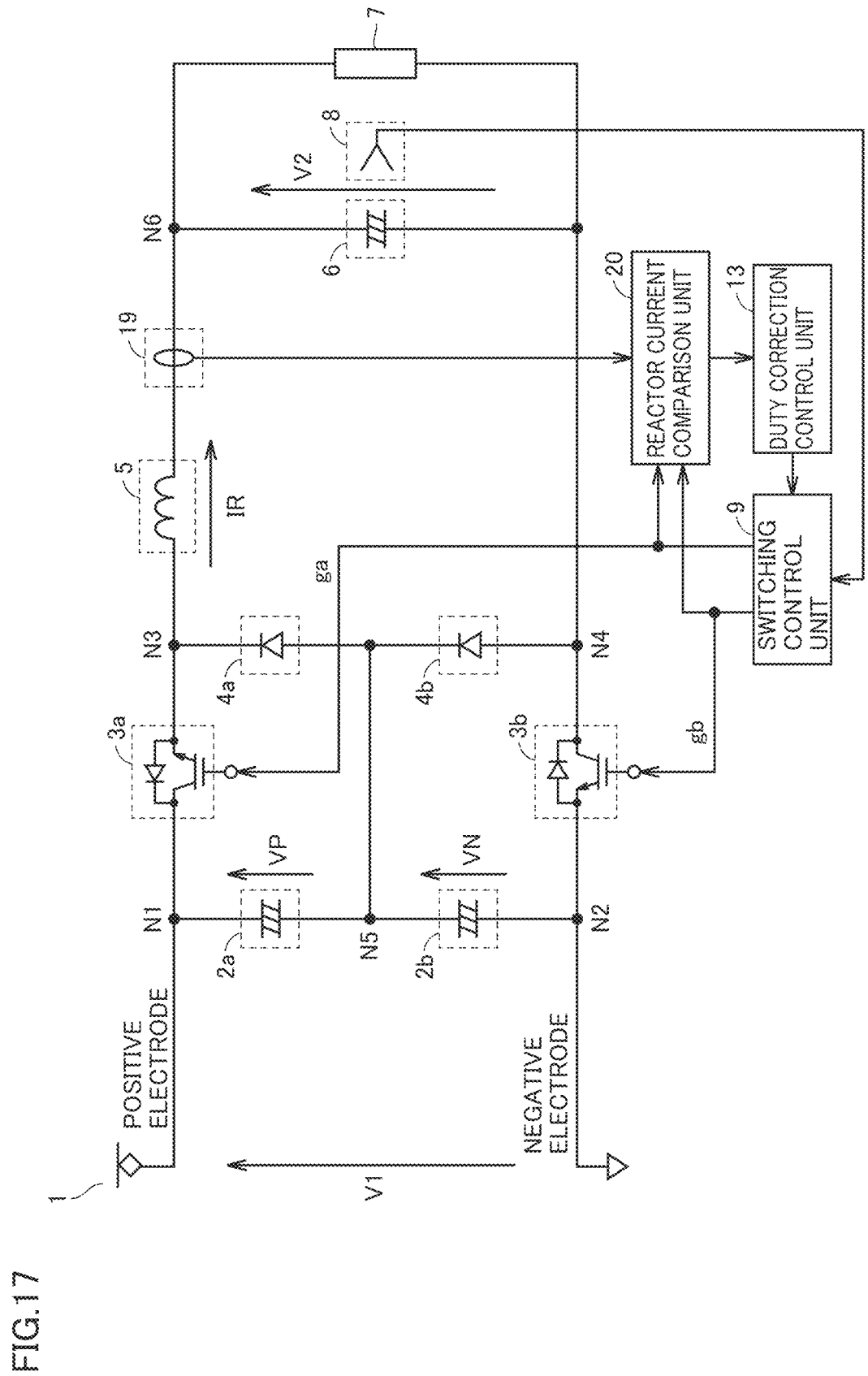
FIG. 17 is a diagram representing a configuration of a double step-down chopper circuit in Embodiment 9.

FIG. 17 is a diagram representing a circuit configuration of a double step-down chopper in Embodiment 9.

The double step-down chopper circuit in Embodiment 9 includes duty correction control unit 13, instead of phase difference correction control unit 12 included in the double step-down chopper circuit in Embodiment 8.

Duty correction control unit 13 determines, based on the difference between the reactor peak current when gate signal ga of the first switching element is turned on and the reactor peak current when gate signal gb of the second switching element is turned on calculated at reactor current comparison unit 20, amount of correction Δd1 of the ON-duty of switching of first switching element 3a and amount of correction Δd2 of the ON-duty of switching of second switching element 3b.

Switching control unit 9 switches first switching element 3a and second switching element 3b based on amounts of correction Δd1 and Δd2. Amount of correction Δd1 and amount of correction Δd2 can be equal in absolute value and different in sign. When the peak current when ga is turned on is smaller than the peak current when gb is turned on, it is assumed that VP<VN is satisfied, and, conversely, when the peak current when ga is turned on is greater than the peak current when gb is turned on, it is assumed that VP>VN is satisfied. The operations when VP<VN and VP>VN are satisfied are similar to the operations described in Embodiment 2.

According to the present embodiment, when variation occurs between the capacitance of first input smoothing capacitor 2a and the capacitance of second input smoothing capacitor 2b, the imbalance between voltage VP across first input smoothing capacitor 2a (first input voltage) and voltage VN across second input smoothing capacitor 2b (second input voltage) is eliminated.

In addition, since reactor current IR can be directly monitored, when an abnormal current flows through the reactor due to magnetic saturation of the reactor, for example, the abnormal current can be detected to immediately stop the switching (stop the operation of the double step-down chopper circuit). As a result, the reliability of the double step-down chopper circuit is improved (a failure of the apparatus can be suppressed).

In addition, since the current needs to be detected at only one location, the apparatus can be reduced in size and cost.

Embodiment 10

Figure 18:
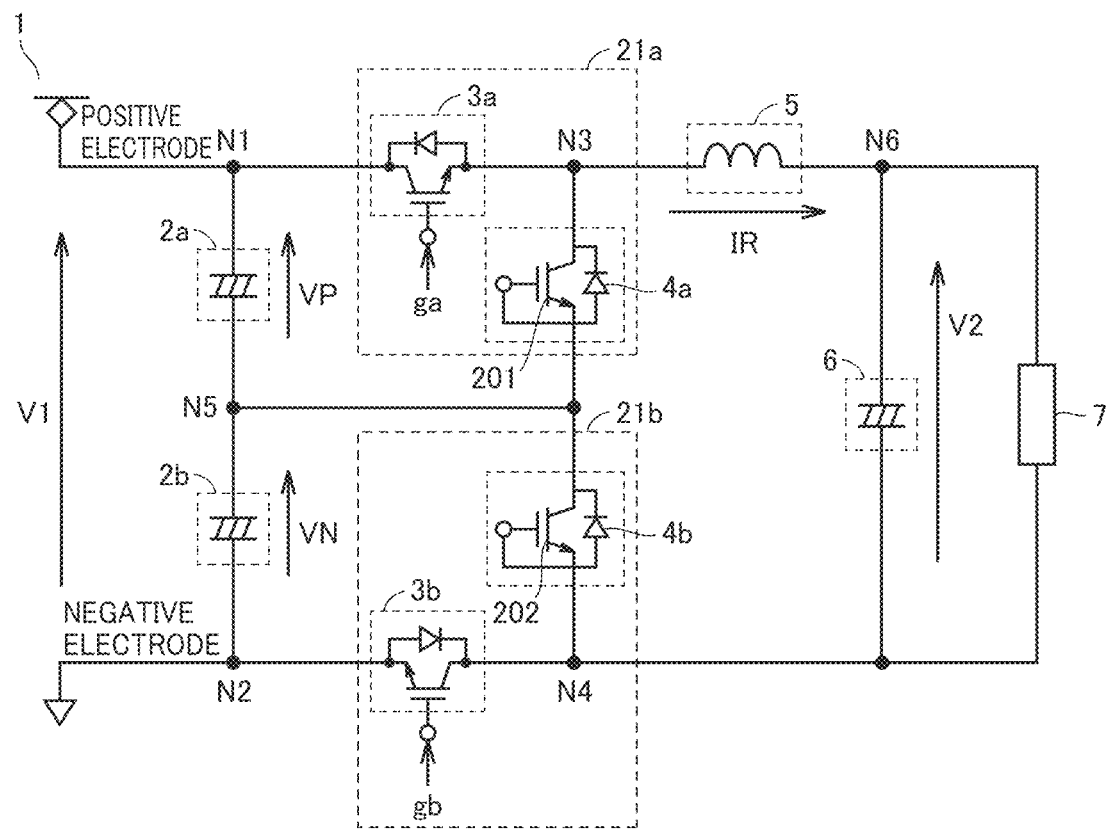
FIG. 18 is a diagram representing a configuration of a double step-down chopper circuit in Embodiment 10.

FIG. 18 is a diagram representing a circuit configuration of a double step-down chopper in Embodiment 10.

The double step-down chopper circuit of Embodiment 10 is a variation of the double step-down chopper circuits of Embodiments 1 to 9. In the double step-down chopper circuit of Embodiment 10, first switching element 3a and first freewheeling diode 4a are implemented by a 2-in-1 first intelligent power module IPM 21a including two IGBTs. In the double step-down chopper circuit, second switching element 3b and second freewheeling diode 4b are implemented by a 2-in-1 second IPM 21b including two IGBTs. IGBTs 201 and 202 connected in parallel with first freewheeling diode 4a and second freewheeling diode 4b are kept ON at all times.

The present embodiment allows the use of protective circuits included in the IPMs, thus eliminating the need to provide additional protective circuits. In addition, since drive circuits of first and second switching elements 3a and 3b are provided within the IPMs, the distance (wire) between the switching elements and the drive circuits is shortened, leading to improved noise resistance.

The configuration of measuring the charging times of first input smoothing capacitor 2a and second input smoothing capacitor 2b described in Embodiment 3 may be added not only to Embodiments 1 and 2 but also to all the other embodiments.

In addition, the configuration for detecting abnormal current described in Embodiment 4 may be added not only to Embodiments 1 to 3 but also to all the other embodiments.

It should be understood that the embodiments disclosed herein are illustrative and non-restrictive in every respect. The scope of the present disclosure is defined by the terms of the claims, rather than the description above, and is intended to include any modifications within the meaning and scope equivalent to the terms of the claims.

REFERENCE SIGNS LIST

1 DC power supply (overhead wire); 2a first input smoothing capacitor; 2b second input smoothing capacitor; 3a first switching element; 3b second switching element; 4a first freewheeling diode; 4b second freewheeling diode; 5 smoothing reactor; 6 output smoothing capacitor; 7 load; 8 output voltage detection unit; 9 switching control unit; 10a first input voltage detection unit; 10b second input voltage detection unit; 11 input voltage comparison unit; 12 phase difference correction control unit; 13 duty correction control unit; 14 initial charging circuit; 15 charging time measurement unit; 16 differential element unit; 17a first switching element current detection unit; 17b second switching element current detection unit; 18 switching element current comparison unit; 19 reactor current detection unit; 20 reactor current comparison unit; 21a first IPM; 21b second IPM; 201, 202 IGBT.

The invention claimed is:

1. A double step-down chopper circuit comprising:
a first input smoothing capacitor and a second input smoothing capacitor connected in series between a first node connected to a positive electrode of an input power supply and a second node connected to a negative electrode of the input power supply;
a first switching element disposed between the first node and a third node;
a second switching element disposed between a fourth node to which one end of a load is connected and the second node;
a first freewheeling diode disposed between a fifth node between the first input smoothing capacitor and the second input smoothing capacitor and the third node;
a second freewheeling diode disposed between the fifth node and the fourth node;
a reactor disposed between a sixth node to which another end of the load is connected and the third node;
an output smoothing capacitor disposed between the sixth node and the fourth node;
a phase difference correction control unit to determine an amount of correction of a difference between a phase of switching of the first switching element and a phase of switching of the second switching element, based on a difference between a current flowing through the first switching element and a current flowing through the second switching element, or a difference between a reactor current when a gate signal of the first switching element is turned on and the reactor current when a gate signal of the second switching element is turned; and
a switching control unit to switch the first switching element and the second switching element based on the amount of correction.

2. The double step-down chopper circuit according to claim 1, wherein
the double step-down chopper circuit comprises
a first input voltage detection unit to detect a voltage across the first input smoothing capacitor,
a second input voltage detection unit to detect a voltage across the second input smoothing capacitor, and
an input voltage comparison unit to compare the voltage of the first input smoothing capacitor with the voltage of the second input smoothing capacitor, and
the phase difference correction control unit determines, based on a voltage difference calculated at the input voltage comparison unit, the amount of correction of the difference between the phase of switching of the first switching element and the phase of switching of the second switching element.

3. The double step-down chopper circuit according to claim 2, wherein
when the phase of switching of the second switching element is delayed from the phase of switching of the first switching element by a difference between a cycle of the first switching element and a cycle of the second switching element, and it is detected that the voltage across the first input smoothing capacitor is smaller than the voltage across the second input smoothing capacitor, the phase difference correction control unit corrects the phase of switching of the second switching element by advancing the phase.

4. The double step-down chopper circuit according to claim 2, wherein
when the phase of switching of the second switching element is delayed from the phase of switching of the first switching element by a difference between a cycle of the first switching element and a cycle of the second switching element, and it is detected that the voltage across the first input smoothing capacitor is smaller than the voltage across the second input smoothing capacitor, the phase difference correction control unit corrects the phase of switching of the first switching element by delaying the phase.

5. The double step-down chopper circuit according to claim 2, wherein
when the phase of switching of the second switching element is delayed from the phase of switching of the first switching element by a difference between a cycle of the first switching element and a cycle of the second switching element, and it is detected that the voltage across the first input smoothing capacitor is greater than the voltage across the second input smoothing capacitor, the phase difference correction control unit corrects the phase of switching of the second switching element by delaying the phase.

6. The double step-down chopper circuit according to claim 2, wherein
when the phase of switching of the second switching element is delayed from the phase of switching of the first switching element by a difference between a cycle of the first switching element and a cycle of the second switching element, and it is detected that the voltage across the first input smoothing capacitor is greater than the voltage across the second input smoothing capacitor, the phase difference correction control unit corrects the phase of switching of the first switching element by advancing the phase.

7. The double step-down chopper circuit according to claim 3, wherein
the difference between the cycle of the first switching element and the cycle of the second switching element is 180°.

8. The double step-down chopper circuit according to claim 1, wherein
the double step-down chopper circuit comprises
a first switching element current detection unit to detect a current flowing through the first switching element,
a second switching element current detection unit to detect a current flowing through the second switching element, and
a switching element current comparison unit to compare the current flowing through the first switching element with the current flowing through the second switching element, and
the phase difference correction control unit determines, based on a current difference calculated at the switching element current comparison unit, the amount of correction of the difference between the phase of switching of the first switching element and the phase of switching of the second switching element.

9. The double step-down chopper circuit according to claim 1, wherein
the double step-down chopper circuit comprises
a reactor current detection unit to detect a current flowing through the reactor, and
a reactor current comparison unit to compare the reactor current when the gate signal of the first switching element is turned on and the reactor current when the gate signal of the second switching element is turned on, and
the phase difference correction control unit determines, based on a current difference calculated at the reactor current comparison unit, the amount of correction of the difference between the phase of switching of the first switching element and the phase of switching of the second switching element.

10. The double step-down chopper circuit according to claim 1, comprising:
an initial charging circuit to initially charge the first input smoothing capacitor and the second input smoothing capacitor; and
a charging time measurement unit to measure a charging time of the first input smoothing capacitor and a charging time of the second input smoothing capacitor.

11. The double step-down chopper circuit according to claim 2, comprising a first differential element unit to differentiate a detected value from the first input voltage detection unit.

12. The double step-down chopper circuit according to claim 1, comprising:
an output voltage detection unit to detect a voltage across the output smoothing capacitor; and
a second differential element unit to differentiate a detected value from the output voltage detection unit.

13. The double step-down chopper circuit according to claim 1, wherein
the first switching element and the first freewheeling diode are implemented by a first IPM, and the second switching element and the second freewheeling diode are implemented by a second IPM, and
a first IGBT connected in parallel with the first freewheeling diode and a second IGBT connected in parallel with the second freewheeling diode are kept ON at all times.

14. A double step-down chopper circuit comprising:
a first input smoothing capacitor and a second input smoothing capacitor connected in series between a first node connected to a positive electrode of an input power supply and a second node connected to a negative electrode of the input power supply;
a first switching element disposed between the first node and a third node;
a second switching element disposed between a fourth node to which one end of a load is connected and the second node;
a first freewheeling diode disposed between a fifth node between the first input smoothing capacitor and the second input smoothing capacitor and the third node;
a second freewheeling diode disposed between the fifth node and the fourth node;
a reactor disposed between a sixth node to which the other another end of the load is connected and the third node;
an output smoothing capacitor disposed between the sixth node and the fourth node;
a duty correction control unit to determine amounts of correction of an ON-duty of switching of the first switching element and an ON-duty of switching of the second switching element, based on a difference between a current flowing through the first switching element and a current flowing through the second switching element, or a difference between a reactor current when a gate signal of the first switching element is turned on and the reactor current when a gate signal of the second switching element is turned on; and a switching control unit to switch the first switching element and the second switching element based on the amounts of correction.

15. The double step-down chopper circuit according to claim 14, wherein the double step-down chopper circuit comprises a first input voltage detection unit to detect a voltage across the first input smoothing capacitor, a second input voltage detection unit to detect a voltage across the second input smoothing capacitor, and an input voltage comparison unit to compare the voltage of the first input smoothing capacitor with the voltage of the second input smoothing capacitor, and the duty correction control unit determines, based on a voltage difference calculated at the input voltage comparison unit, the amounts of correction of the ON-duty of switching of the first switching element and the ON-duty of switching of the second switching element.

16. The double step-down chopper circuit according to claim 15, wherein when the ON-duty of switching of the first switching element is equal to the ON-duty of switching of the second switching element, and it is detected that the voltage across the first input smoothing capacitor is smaller than the voltage across the second input smoothing capacitor, the duty correction control unit corrects the ON-duty of switching of the first switching element by shortening the ON-duty, and corrects the ON-duty of switching of the second switching element by lengthening the ON-duty.

17. The double step-down chopper circuit according to claim 15, wherein when the ON-duty of switching of the first switching element is equal to the ON-duty of switching of the second switching element, and it is detected that the voltage across the first input smoothing capacitor is greater than the voltage across the second input smoothing capacitor, the duty correction control unit corrects the ON-duty of switching of the first switching element by lengthening the ON-duty, and corrects the ON-duty of switching of the second switching element by shortening the ON-duty.

18. The double step-down chopper circuit according to claim 12, wherein an absolute value of the amount of correction of the ON-duty of switching of the first switching element and an absolute value of the amount of correction of the ON-duty of switching of the second switching element are equal to each other.

19. The double step-down chopper circuit according to claim 14, wherein the double step-down chopper circuit comprises a first switching element current detection unit to detect a current flowing through the first switching element, a second switching element current detection unit to detect a current flowing through the second switching element, and a switching element current comparison unit to compare the current flowing through the first switching element with the current flowing through the second switching element, and the duty correction control unit determines, based on a current difference calculated at the switching element current comparison unit, the amounts of correction of the ON-duty of switching of the first switching element and the ON-duty of switching of the second switching element.

20. The double step-down chopper circuit according to claim 14, wherein the double step-down chopper circuit comprises a reactor current detection unit to detect a current flowing through the reactor, and a reactor current comparison unit to compare the reactor current when the gate signal of the first switching element is turned on and the reactor current when the gate signal of the second switching element is turned on, and the duty correction control unit determines, based on a current difference calculated at the reactor current comparison unit, the amounts of correction of the ON-duty of switching of the first switching element and the ON-duty of switching of the second switching element.

* * * * *